United States Patent
Daido et al.

(10) Patent No.: US 9,855,971 B2
(45) Date of Patent: Jan. 2, 2018

(54) VEHICLE BODY STRUCTURE WITH IMPACT ABSORBING PART

(71) Applicant: HONDA MOTOR CO., LTD., Minato-Ku, Tokyo (JP)

(72) Inventors: Kazuhiro Daido, Wako (JP); Tatsuya Ishizaki, Wako (JP); Akira Hojo, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 15/289,352

(22) Filed: Oct. 10, 2016

(65) Prior Publication Data

US 2017/0106909 A1    Apr. 20, 2017

(30) Foreign Application Priority Data

Oct. 15, 2015 (JP) ................. 2015-204038

(51) Int. Cl.
*B60J 7/00* (2006.01)
*B62D 21/15* (2006.01)
(Continued)

(52) U.S. Cl.
CPC ............ *B62D 21/152* (2013.01); *B60R 19/02* (2013.01); *B60R 19/34* (2013.01); *B62D 25/082* (2013.01);
(Continued)

(58) Field of Classification Search
CPC ......... B60R 19/18; B60R 19/34; B60R 21/34; B60R 2019/186; B60R 2019/1873;
(Continued)

(56) References Cited

U.S. PATENT DOCUMENTS 4,272,114 A * 6/1981 Hirano .................... B60R 19/34
188/377
4,702,515 A * 10/1987 Kato .................... B62D 21/152
188/377
(Continued)

FOREIGN PATENT DOCUMENTS

JP    2009-061845 A    3/2009
JP    2010-076476 A    4/2010
(Continued)

OTHER PUBLICATIONS

Office Action dated Jul. 18, 2017 issued in the corresponding Japanese Patent Application 2015-204038 with a partial English translation thereof.

*Primary Examiner* — Kiran B Patel
(74) *Attorney, Agent, or Firm* — Carrier Blackman & Associates, P.C.; Joseph P. Carrier; William D. Blackman

(57) ABSTRACT

A vehicle body structure includes a frame impact absorbing part extending from the side of a left front side frame in the longitudinal direction of the vehicle body. The frame impact absorbing part includes first and second frame bending members that form a frame tubular body, upper and lower frame flanges projecting outward from the frame tubular body, upper and lower first fragile portions that divide the frame flanges in the longitudinal direction of the vehicle body, and a plurality of frame rigid portions formed at a rear end of the frame tubular body on the rear side of the vehicle body with respect to the first fragile portions.

8 Claims, 13 Drawing Sheets

(51) Int. Cl.
*B60R 19/02* (2006.01)
*B62D 25/08* (2006.01)
*B60R 19/34* (2006.01)
*B60R 21/00* (2006.01)

(52) U.S. Cl.
CPC ............... *B60R 2021/0004* (2013.01); *B60R 2021/0023* (2013.01)

(58) Field of Classification Search
CPC ............ B60R 2021/0435; B60R 21/04; B62D 21/152; B62D 1/195; F16F 7/12
USPC .... 296/187.09; 293/102, 117, 120, 132, 133
See application file for complete search history.

(56) References Cited

U.S. PATENT DOCUMENTS

| | | | | |
|---|---|---|---|---|
| 5,033,593 A * | 7/1991 | Kazuhito | ............... | B60J 5/0443 188/377 |
| 5,732,801 A * | 3/1998 | Gertz | ............... | F16F 7/123 188/377 |
| 6,003,934 A * | 12/1999 | Usui | ............... | B62D 21/02 296/187.09 |
| 6,474,709 B2 * | 11/2002 | Artner | ............... | B60R 19/34 293/133 |
| 6,648,385 B2 * | 11/2003 | Frank | ............... | B60R 19/34 293/120 |
| 6,814,381 B1 * | 11/2004 | Frank | ............... | B60R 19/34 293/120 |
| 7,631,924 B2 * | 12/2009 | Nilsson | ............... | B60R 19/34 296/133 |
| 7,793,997 B2 * | 9/2010 | Karlander | ............... | B60R 19/34 293/132 |
| 8,720,961 B2 * | 5/2014 | Han | ............... | B60R 19/34 293/133 |
| 8,794,696 B2 | 8/2014 | Iseki et al. | | |
| 8,801,059 B2 * | 8/2014 | Kim | ............... | B60R 19/34 293/102 |
| 9,446,725 B2 * | 9/2016 | Yamada | ............... | B62D 21/152 |
| 2004/0135382 A1 * | 7/2004 | Sakuma | ............... | B60R 19/34 293/102 |
| 2007/0056819 A1 * | 3/2007 | Kano | ............... | B60R 19/34 188/371 |
| 2010/0019518 A1 * | 1/2010 | Stewart | ............... | B60R 19/34 293/133 |
| 2010/0327613 A1 * | 12/2010 | Arns | ............... | B60R 19/18 293/149 |
| 2013/0113224 A1 * | 5/2013 | Tsuchida | ............... | B60R 19/18 293/102 |
| 2015/0061307 A1 * | 3/2015 | Nakanishi | ............... | B60R 19/34 293/133 |
| 2015/0069785 A1 * | 3/2015 | Sakakibara | ............... | B62D 25/085 296/187.1 |
| 2015/0151792 A1 * | 6/2015 | Mori | ............... | B62D 21/152 296/187.09 |
| 2016/0129866 A1 * | 5/2016 | Kamiya | ............... | B60R 19/023 293/133 |
| 2016/0207573 A1 * | 7/2016 | Kitakata | ............... | B62D 21/152 |

FOREIGN PATENT DOCUMENTS

JP        5168477 B2        3/2013
WO        2012/102067 A1    8/2012

* cited by examiner

VEHICLE BODY STRUCTURE WITH IMPACT ABSORBING PART

CROSS REFERENCE TO RELATED APPLICATIONS

This application claims priority to Japanese Patent Application No. 2015-204038 filed on Oct. 15, 2015, the entire contents of which are incorporated by reference herein.

BACKGROUND OF THE INVENTION

Field of the Invention

The present invention relates to a vehicle body structure with an impact absorbing part, which includes an impact absorbing part extending from an end side of a vehicle body frame member in a longitudinal (front-rear) longitudinal direction of the vehicle body.

Description of the Related Art

There is known a vehicle body structure in which bumper beam extensions (to be referred to as impact absorbing parts hereinafter) project from the front ends of left and right front side frames, and a bumper beam is put between the left and right impact absorbing parts.

According to the vehicle body structure, when the impact absorbing parts are deformed by a collision load (to be referred to as a light collision load) input by a light collision, the light energy of the light collision load can be absorbed by the impact absorbing parts. This can suppress deformation of the front side frames and reduce the repair cost of the vehicle.

In a frontal collision or offset collision of a high collision speed more than a light collision, passengers are considered to be more suitably protected using the impact absorbing parts. To do this, it is necessary to raise the rigidity of the impact absorbing parts to some extent and absorb initial energy at an early stage of a frontal collision or offset collision.

This makes it possible to reduce the deceleration (acceleration) applied to the passengers upon a frontal collision or offset collision.

Recently, vehicles are growing in which a platform (body frame) is diverted to a plurality of automobile models. Hence, to cope with each automobile model, the arrangement locations of the front side frames are determined. In addition, to prevent damage to a radiator and the like upon a light collision, the shape and arrangement location of the bumper beam are determined in accordance with the design of each automobile model.

Hence, the longitudinal direction length of each impact absorbing part that intervenes between the bumper beam and the front side frame is automatically determined.

For this reason, when a platform is employed, for example, the length of each impact absorbing part may increase in the longitudinal direction of the vehicle body. If, in this state, the rigidity of the impact absorbing parts is ensured to absorb a light collision load upon a light collision and absorb initial energy of a frontal collision or offset collision, the rigidity of the impact absorbing parts is thought to exceed the load bearing ability of the platform (body frame).

It is therefore difficult to ensure the rigidity of the impact absorbing parts to absorb the initial energy of a frontal collision or offset collision.

There is also proposed a vehicle body structure in which an impact absorbing part is formed from an upper member having an inverted U-shaped section, a lower member having a U-shaped section, and a reinforcing member (for example, Japanese Patent No. 5168477).

That is, the inner wall of the upper member formed into an inverted U-shaped sectional shape, the inner wall of the lower member formed into a U-shaped sectional shape, and the inner flange of the reinforcing member are joined in a state in which the three members are overlaid. Similarly, the outer wall of the upper member, the outer wall of the lower member, and the outer flange of the reinforcing member are joined in a state in which the three members are overlaid.

An almost rectangular tubular body is thus formed by the upper member and the lower member, and the reinforcing member is provided in the tubular body.

Additionally, at the front portion of the tubular body, a plurality of beads are formed to extend in the vehicle width direction on the upper portion, the lower portion, the inner wall, and the outer wall. It is therefore possible to crush, in the longitudinal direction of the vehicle body, the front portion of the tubular body by a light collision load input by a light collision and absorb the light collision load.

Furthermore, at the rear portion of the tubular body, a plurality of beads are formed to extend in the longitudinal direction of the vehicle body on the inner wall and the outer wall. In addition, the reinforcing member is provided in the tubular body. Hence, the rigidity of the rear portion of the tubular body is ensured to absorb the initial energy of a frontal collision or offset collision.

According to the impact absorbing part of Japanese Patent No. 5168477, it is possible to absorb light energy upon a light collision and also absorb the initial energy of a frontal collision or offset collision.

In the impact absorbing part of Japanese Patent No. 5168477, however, the reinforcing member needs to be provided in the tubular body to enable absorption of light energy upon a light collision or the initial energy of a frontal collision or offset collision. This leads to an increase in the number of parts, which impedes suppression of an increase in cost and weight.

SUMMARY OF THE INVENTION

The present invention has been made in consideration of the aforementioned problems, and realizes a vehicle body structure with an impact absorbing part capable of absorbing light energy upon a light collision and absorbing the initial energy of a frontal collision or offset collision without using a reinforcing member.

In order to solve the aforementioned problems, the first aspect of the present invention provides a vehicle body structure with an impact absorbing part, which includes an impact absorbing part extending in a longitudinal direction of a vehicle body from an end side of a vehicle body frame member, wherein the impact absorbing part comprises: a first bending member bent into a substantially U-shaped sectional shape; a second bending member bent into a substantially U-shaped sectional shape and connected to the first bending member so as to form a hollow tubular body; a flange projecting outward from the tubular body and extending in the longitudinal direction of the vehicle body up to a side of the vehicle body frame member on a lateral side of one of the first bending member and the second bending member; a first fragile portion configured to divide the flange in the longitudinal direction of the vehicle body and serve as a starting point of deformation upon a light collision; and a rigid portion formed on the side of the vehicle body frame member with respect to the first fragile portion.

As described above, the flange is formed at a side end of one of the first bending member and the second bending member. The flange projects outward from the tubular body and extends in the longitudinal direction of the vehicle body up to the vehicle body frame member side. In addition, the flange is divided by the first fragile portion in the longitudinal direction of the vehicle body.

Hence, when a light collision load is input to the end portion of the impact absorbing part by a light collision, stress can be concentrated to the first fragile portion, and the first fragile portion can be used as the starting point (trigger) of deformation of the impact absorbing part. It is therefore possible to efficiently deform the impact absorbing part from the first fragile portion and suitably absorb the light collision load without deforming the vehicle body frame member by the light collision load input by the light collision.

In addition, the rigid portion is formed on the vehicle body frame member side with respect to the first fragile portion. That is, the rigid portion and the flange are formed in the portion of the shock absorbing member on the vehicle body frame member side. Hence, the rigidity of the portion on the vehicle body frame member side is ensured by the rigid portion and the flange without using a reinforcing member as a separate member.

Accordingly, the portion on the vehicle body frame member side with the ensured rigidity can be crushed by a collision load input by a frontal collision or offset collision, and the initial energy of the collision load can suitably be absorbed.

It is thus possible to absorb light energy upon a light collision and absorb the initial energy of a frontal collision or offset collision without using a reinforcing member.

When the rigidity of the portion on the vehicle body frame member side is ensured without using a reinforcing member as a separate member, the impact absorbing part (that is, the vehicle body structure) can be made lightweight. Additionally, when a reinforcing member is unnecessary, the structure is simplified, and the manufacture can be facilitated.

In the invention according to claim 2, preferably, the impact absorbing part comprises a second fragile portion on a collision load input side with respect to the flange.

As described above, the second fragile portion is formed on the collision load input side with respect to the flange out of the impact absorbing part. Hence, when a light collision load is input to the end portion of the impact absorbing part by a light collision, the impact absorbing part can reliably be deformed from the second fragile portion by the input light collision load without deforming the vehicle body frame member. It is therefore possible to suitably absorb the light collision load input to the impact absorbing part.

In the invention according to claim 3, preferably, the vehicle body frame member comprises a front side frame arranged on an outside in a vehicle width direction and extending in the longitudinal direction of the vehicle body, the impact absorbing part comprises a frame impact absorbing part provided on a side of a front end of the front side frame, an upper member is provided on an outside of the front side frame in the vehicle width direction, a member impact absorbing part is provided on an outside of the impact absorbing part in the vehicle width direction on a side of a front end of the upper member, and the member impact absorbing part comprises: a hollow member tubular body extending in the longitudinal direction of the vehicle body; and a third fragile portion formed in the member tubular body and arranged substantially at the same position as the first fragile portion in the longitudinal direction of the vehicle body.

As described above, the member impact absorbing part is provided on the front end side of the upper member, and the third fragile portion is formed in the member tubular body of the member impact absorbing part. In addition, the third fragile portion is arranged almost at the same position as the first fragile portion in the longitudinal direction of the vehicle body.

Hence, when a light collision load is input to the impact absorbing part or the member impact absorbing part by a light collision, the impact absorbing part can be deformed from the second fragile portion, and the member impact absorbing part can be deformed from the third fragile portion by the input light collision load without deforming the vehicle body frame member.

This can increase the absorption amount of the light collision load input to the impact absorbing part or the member impact absorbing part.

On the other hand, when the member impact absorbing part is provided on the front end side of the upper member, rigidity to a collision load input by a frontal collision or offset collision can be raised. This can increase the absorption amount of the initial energy of the collision load by the impact absorbing part or the member impact absorbing part.

In the invention according to claim 4, preferably, the member impact absorbing part comprises: a member flange projecting outward from the member tubular body and extending up to a side of the upper member in the longitudinal direction of the vehicle body on the side of the upper member with respect to the third fragile portion; and a member rigid portion formed on the side of the upper member with respect to the third fragile portion.

As described above, the member flange is provided on the portion of the member impact absorbing part on the upper member side with respect to the third fragile portion. The member flange is extended up to the upper member side in the longitudinal direction of the vehicle body. In addition, the member rigid portion is formed on the upper member side with respect to the third fragile portion.

Hence, the rigidity of the portion on the upper member side is ensured by the member rigid portion and the member flange without using a reinforcing member as a separate member.

Accordingly, the portion of the impact absorbing part on the vehicle body frame member side or the portion of the member impact absorbing part on the upper member side can be crushed by a collision load input by a frontal collision or offset collision, and the absorption amount of the initial energy of the collision load can further be increased.

In the invention according to claim 5, preferably, the vehicle body structure further comprises a bumper beam with a slope portion arranged at ends of the frame impact absorbing part and the member impact absorbing part, wherein the member impact absorbing part comprises an inner wall on an inside in the vehicle width direction, and the inner wall is formed to curve such that an end of the inner wall comes close to the frame impact absorbing part toward the bumper beam.

As described above, the member impact absorbing part includes the inner wall. In addition, the end portion of the inner wall is formed to curve such that it comes close to the impact absorbing part toward the bumper beam. Hence, the end portion formed to curve can be crushed by a light collision load input upon a light collision.

This can further increase the absorption amount of the light collision load input to the member impact absorbing part.

In the invention according to claim 6, preferably, the member impact absorbing part comprises a fourth fragile portion on an outside of the member tubular body in the vehicle width direction.

In a case of an oblique collision out of a light collision, a light collision load is considered to be input obliquely from the front side to the member impact absorbing part. To cope with this, in claim 6, the fourth fragile portion is provided on the outside of the member tubular body in the vehicle width direction. Hence, the member impact absorbing part can efficiently be bent and deformed, by the light collision load input obliquely from the front side, from the fourth fragile portion serving as the starting point.

This allows the member impact absorbing part to suitably absorb the light collision load input obliquely from the front side to the member impact absorbing part.

In the invention according to claim 7, preferably, the frame impact absorbing part comprises a second fragile portion on a collision load input side with respect to the flange, and in the frame impact absorbing part, the tubular body is formed into a substantially octagonal section so as to form an upper outer ridge portion and a lower outer ridge portion on an outer side of the tubular body in the vehicle width direction, an end of each of the upper outer ridge portion and the lower outer ridge portion is formed to curve such that the end comes close to the member impact absorbing part toward the bumper beam, and the second fragile portion is provided in an outer wall on the outside of the tubular body in the vehicle width direction at the end of each of the upper outer ridge portion and the lower outer ridge portion.

In a case of an oblique collision out of a light collision, a light collision load is considered to be input obliquely from the front side to the impact absorbing part. To cope with this, in claim 7, the end portion of each of the upper outer ridge portion and the lower outer ridge portion is formed to curve such that the end portion comes close to the member impact absorbing part toward the bumper beam. In addition, the second fragile portion is provided in the outer wall on the outside of the tubular body in the vehicle width direction at the end portion of each of the upper outer ridge portion and the lower outer ridge portion.

It is therefore possible to suitably increase the rigidity (that is, the load bearing ability) to the light collision load input obliquely from the front side by the end portion of each of the upper outer ridge portion and the lower outer ridge portion. Accordingly, the impact absorbing part can efficiently be bent and deformed, by the light collision load input obliquely from the front side, from the second fragile portion serving as the starting point, and the absorption amount of the light collision load can be increased.

In the invention according to claim 8, preferably, the bumper beam comprises: a bumper front wall formed on a front side of the vehicle body; a bumper upper portion projecting from an upper side of the front wall 122 to a rear side of the vehicle body; and a bumper lower portion projecting from a lower side of the front wall to the rear side of the vehicle body, the bumper beam is formed into a substantially U-shaped sectional shape by the bumper front wall, the bumper upper portion, and the bumper lower portion, and the ends of the frame impact absorbing part and the member impact absorbing part abut against the bumper front wall and are welded to the bumper front wall, a rear side of the bumper upper portion, and a rear side of the bumper lower portion.

As described above, the end portions of the impact absorbing part and the member impact absorbing part abut against the bumper front wall and are welded to the bumper front wall, the rear side of the bumper upper portion, and the rear side of the bumper lower portion. It is therefore possible to bring the bumper front wall into contact with the end portions of the impact absorbing part and the member impact absorbing part. Accordingly, the bumper beam can come close to the impact absorbing part and the member impact absorbing part, and the total body length can be shortened.

When the bumper front wall is brought into contact with the end portions of the impact absorbing part and the member impact absorbing part, a light collision load by a light collision or a collision load by a frontal collision or offset collision can quickly be transmitted to the impact absorbing parts. This allows the impact absorbing parts to early absorb the light collision load or the collision load.

According to the present invention, it is possible to provide an impact absorbing part capable of absorbing light energy upon a light collision and absorbing the initial energy of a frontal collision or offset collision without using a reinforcing member.

Other features and advantages besides those discussed above shall be apparent to those skilled in the art from the description of an embodiment of the invention as follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

DESCRIPTION OF THE EMBODIMENTS

The best mode for carrying out the present invention will now be described with reference to the accompanying drawings. Note that "front (Fr)", "rear (Rr)", "left (L)", and "right (R)" comply with directions viewed from a driver.

A vehicle body structure 10 with an impact absorbing part according to an embodiment will be described. The vehicle body structure 10 with an impact absorbing part will be abbreviated as "body structure 10" hereinafter.

Figure 1:
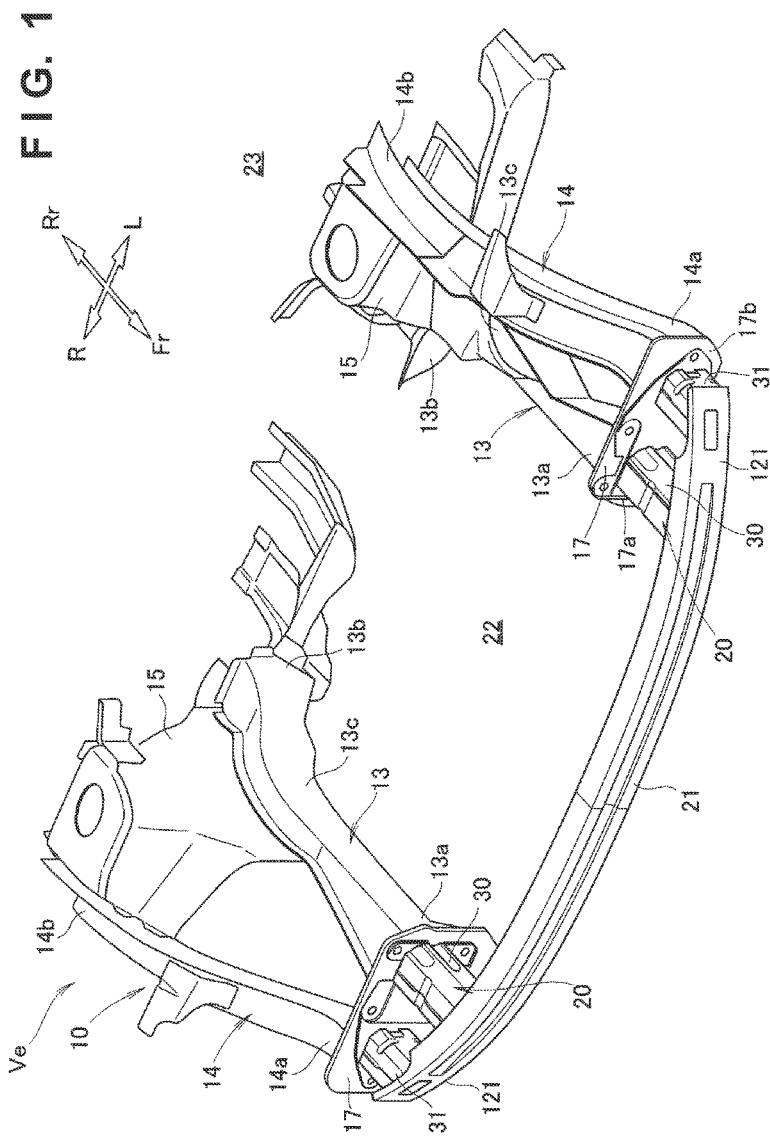
FIG. 1 is a perspective view showing a vehicle body structure with an impact absorbing part according to the present invention.

As shown in FIG. 1, the vehicle body structure 10 is a part that forms the body front structure of a vehicle Ve.

The vehicle body structure 10 includes a left front side frame 13 provided on the left side of the vehicle Ve in the vehicle width direction, a right front side frame 13 provided on the right side of the vehicle Ve in the vehicle width direction, and a left upper member 14 and a right upper member 14 which are provided on the outside of the front side frames 13 in the vehicle width direction.

The vehicle body structure 10 also includes a left damper housing 15 that intervenes between a rear portion 13c of the left front side frame 13 and a rear portion 14b of the left upper member 14, and a right damper housing 15 that intervenes between the rear portion 13c of the right front side frame 13 and the rear portion 14b of the right upper member 14.

The vehicle body structure 10 further includes a left connecting plate 17 that connects a front end (end) 13a of the left front side frame 13 and a front end 14a of the left upper member 14, a left shock absorbing means 20 connected to the left connecting plate 17, a right connecting plate 17 that connects the front end 13a of the right front side frame 13 and the front end 14a of the right upper member 14, a right shock absorbing means 20 connected to the right connecting plate 17, and a bumper beam 21 bridged over the left shock absorbing means 20 and the right shock absorbing means 20.

An engine room 22 is formed on the rear side of the vehicle body with respect to the bumper beam 21 between the left front side frame 13 and the right front side frame 13. A power unit is arranged in the engine room 22.

Note that the vehicle body structure 10 has an almost bilaterally symmetrical structure. Hence, a left member and a right member of the vehicle body structure 10 are denoted by the same reference numeral. The left member will be described in detail, and a description of the right member will be omitted.

The left front side frame 13 is a rigid body frame member formed into an almost rectangular sectional shape and extending in the longitudinal direction of the vehicle body in a state in which the left front side frame 13 is arranged outside on the left side in the vehicle width direction. A rear end 13b of the left front side frame 13 is joined to a lower dashboard. A cabin 23 is formed on the rear side of the vehicle body with respect to the lower dashboard. That is, the cabin 23 is formed on the rear side of the vehicle body with respect to the rear end 13b of the left front side frame 13.

The left upper member 14 is provided on the outside of the left front side frame 13 in the vehicle width direction.

The left upper member 14 has the rear portion 14b joined to the damper housing 15, and extends downslope to the front side of the vehicle body via the damper housing 15. The left upper member 14 is a rigid body frame member formed into an almost rectangular sectional shape.

The front end 14a of the left upper member 14 is connected to the front end 13a of the left front side frame 13 via a left gusset 25.

The left connecting plate 17 is mounted from the front side of the vehicle body onto the front end 13a of the left front side frame 13, the front end 14a of the left upper member 14, and the left gusset 25. The left connecting plate 17 is formed into an almost rectangular shape viewed from the front.

The front end 13a of the left front side frame 13 is joined to a vehicle width direction inner half portion 17a of the left connecting plate 17. The front end 14a of the left upper member 14 is joined to a vehicle width direction outer half portion 17b of the left connecting plate 17.

Figure 2:
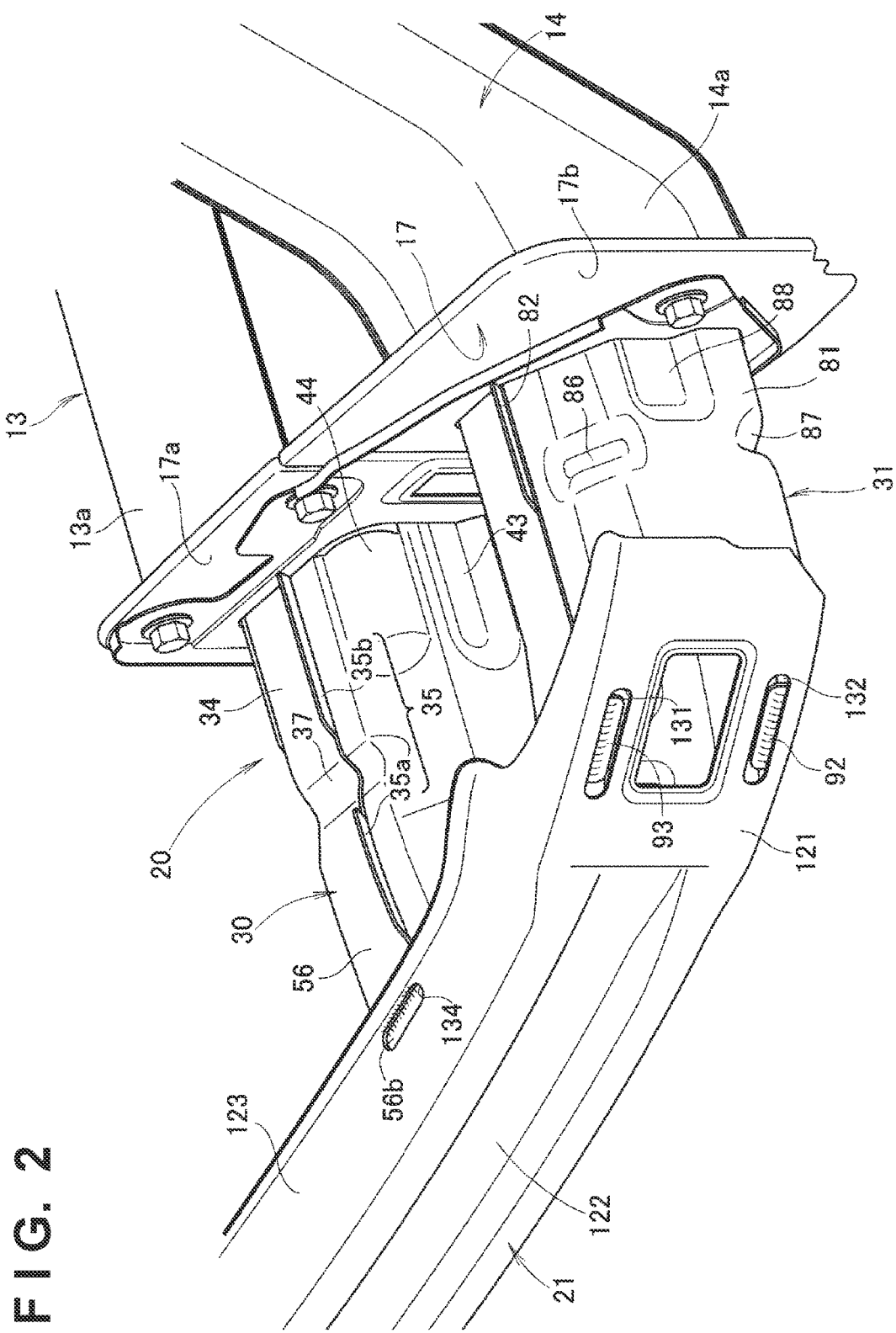
FIG. 2 is a perspective view showing a left shock absorbing means and a bumper beam in FIG. 1.
Figure 3:
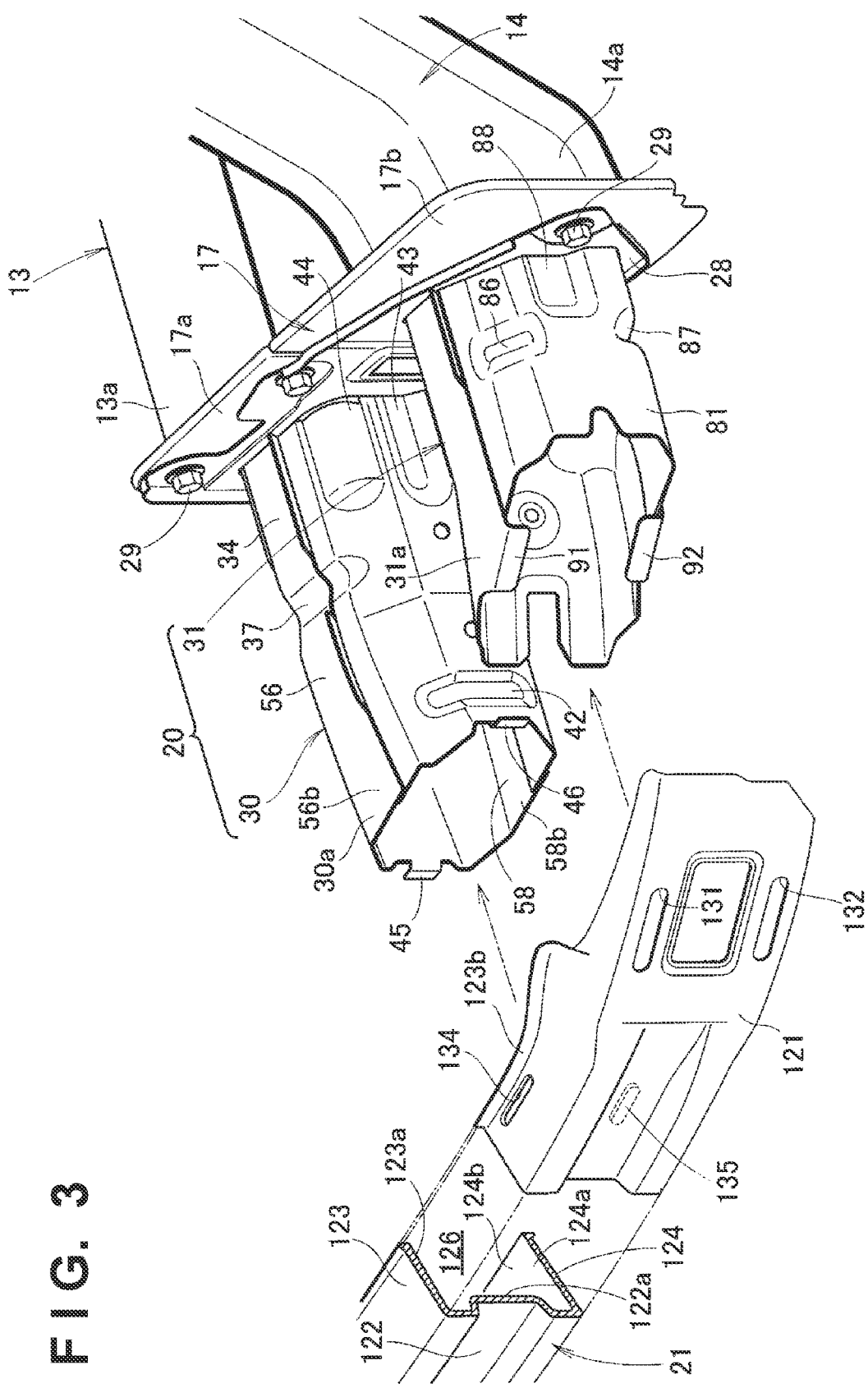
FIG. 3 is an exploded perspective view showing the left shock absorbing means and the bumper beam in FIG. 2.

As shown in FIGS. 2 and 3, the left shock absorbing means 20 is mounted on the left connecting plate 17. The left shock absorbing means 20 includes a base 28 mounted from the front side of the vehicle body onto the left connecting plate 17 by a plurality of bolts 29, a frame impact absorbing part (impact absorbing part) 30 connected to the inside of the base 28 in the vehicle width direction from the front side of the vehicle body, and a member impact absorbing part 31 connected to the outside of the base 28 in the vehicle width direction from the front side of the vehicle body.

That is, the frame impact absorbing part 30 is connected to the vehicle width direction inner half portion 17a of the left connecting plate 17 from the front side of the vehicle body. In addition, the member impact absorbing part 31 is connected to the vehicle width direction outer half portion 17b of the left connecting plate 17 from the front side of the vehicle body.

Figure 4:
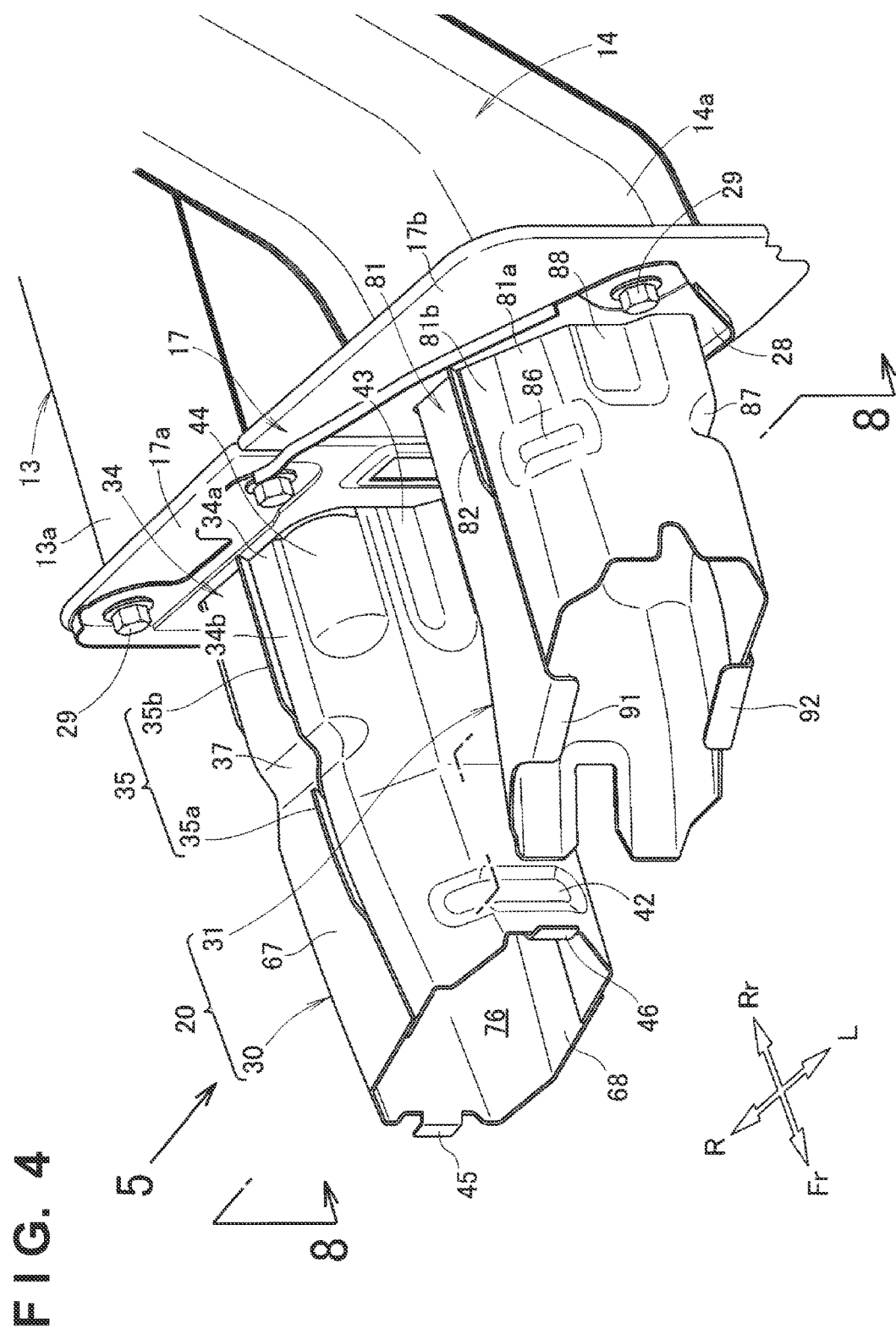
FIG. 4 is a perspective view showing the left shock absorbing means in FIG. 3.
Figure 5:
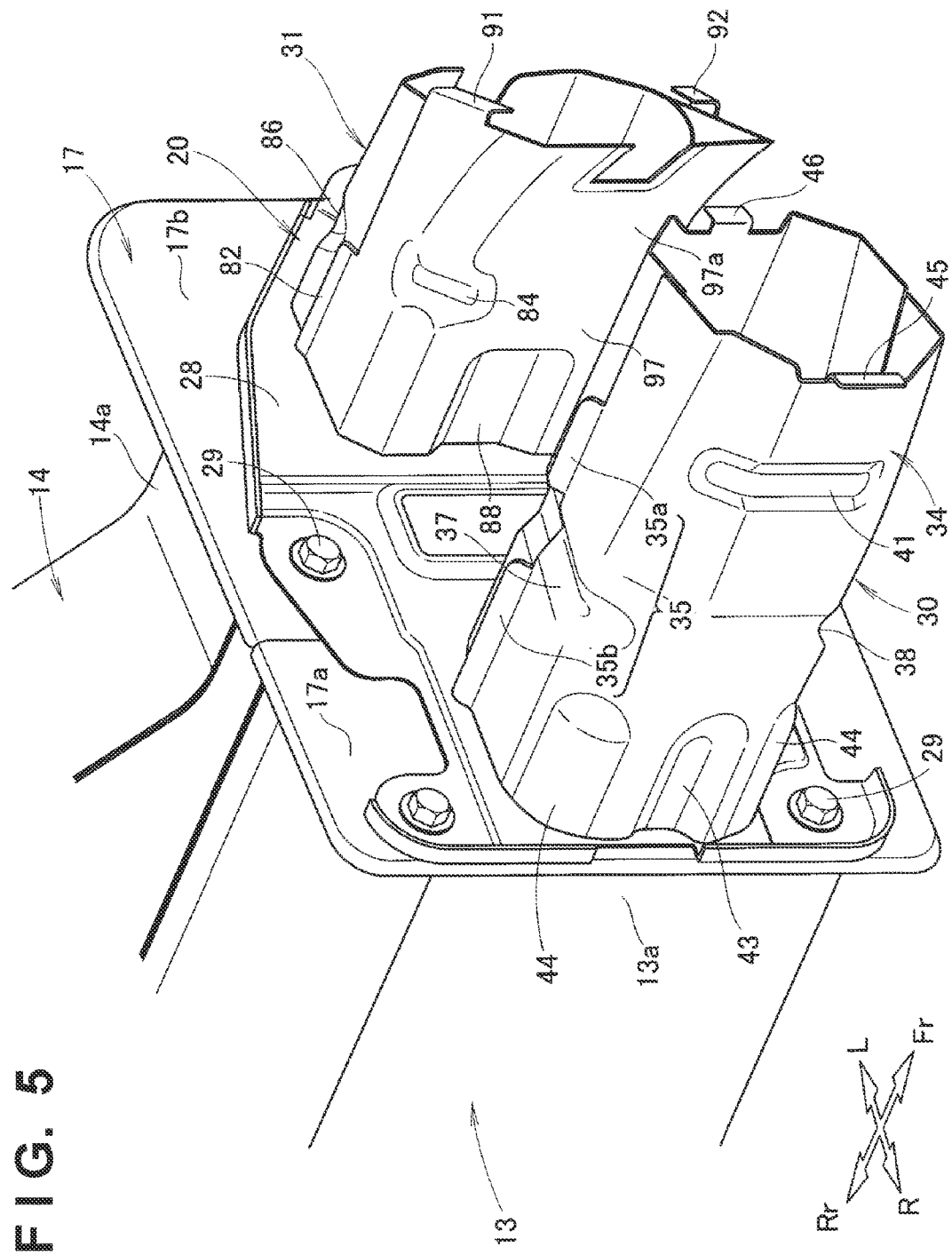
FIG. 5 is a view from an arrow 5 in FIG. 4.

As shown in FIGS. 4 and 5, the frame impact absorbing part 30 is connected to the vehicle width direction inner half portion 17a of the left connecting plate 17 from the front side of the vehicle body. The frame impact absorbing part 30 is a bumper beam extension that projects from the side of the front end 13a of the left front side frame 13 up to the bumper beam 21 (see FIG. 2) on the front side of the vehicle body.

More specifically, the frame impact absorbing part 30 includes a hollow frame tubular body (tubular body) 34, an upper frame flange (flange) 35, a lower frame flange (flange) 36 (see FIG. 6), an upper first fragile portion (first fragile portion) 37, a lower first fragile portion (first fragile portion) 38 (see FIG. 6 as well), an inner second fragile portion (second fragile portion) 41, an outer second fragile portion (second fragile portion) 42, a plurality of frame rigid portions (rigid portions) 43 and 44, an inner joint piece 45, and an outer joint piece 46.

Figure 6:
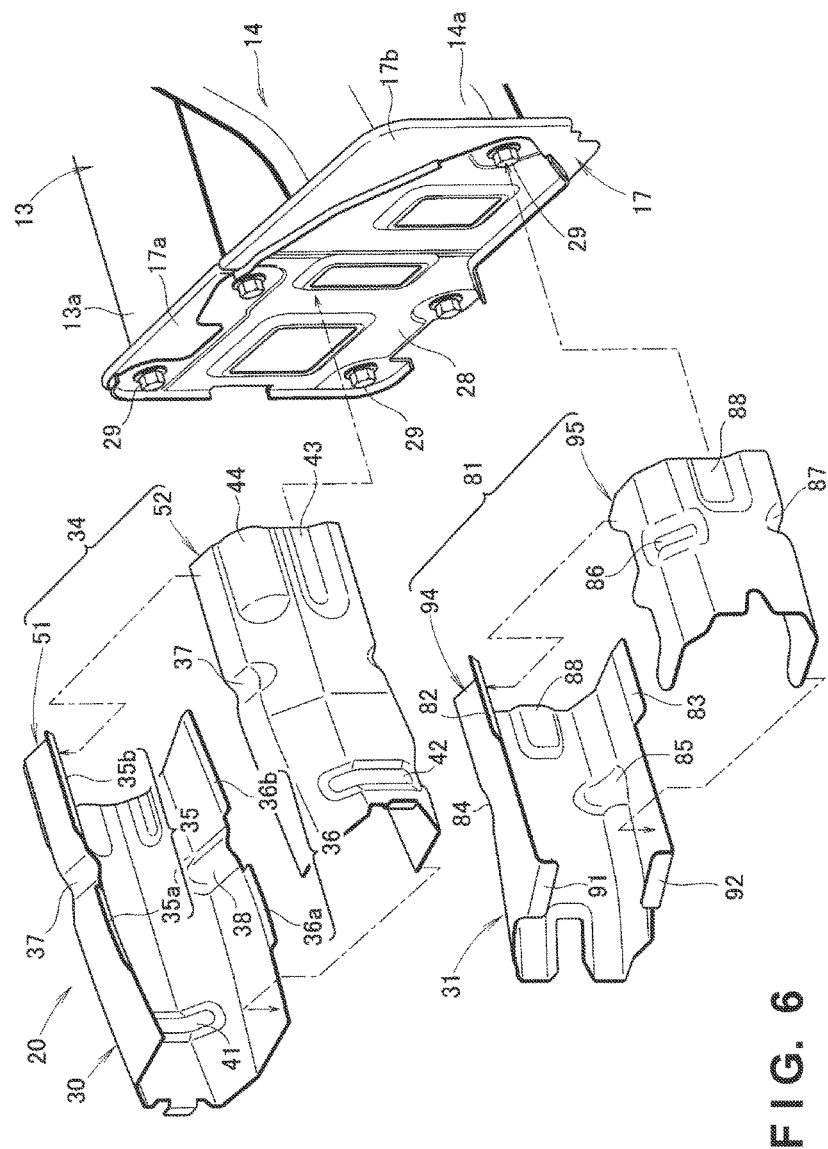
FIG. 6 is an exploded perspective view showing the left shock absorbing means in FIG. 4.

As shown in FIG. 6, the frame tubular body 34 includes a first frame bending member (first bending member) 51 bent into an almost U-shaped sectional shape, and a second frame bending member (second bending member) 52 bent into an almost U-shaped sectional shape.

Figure 7:
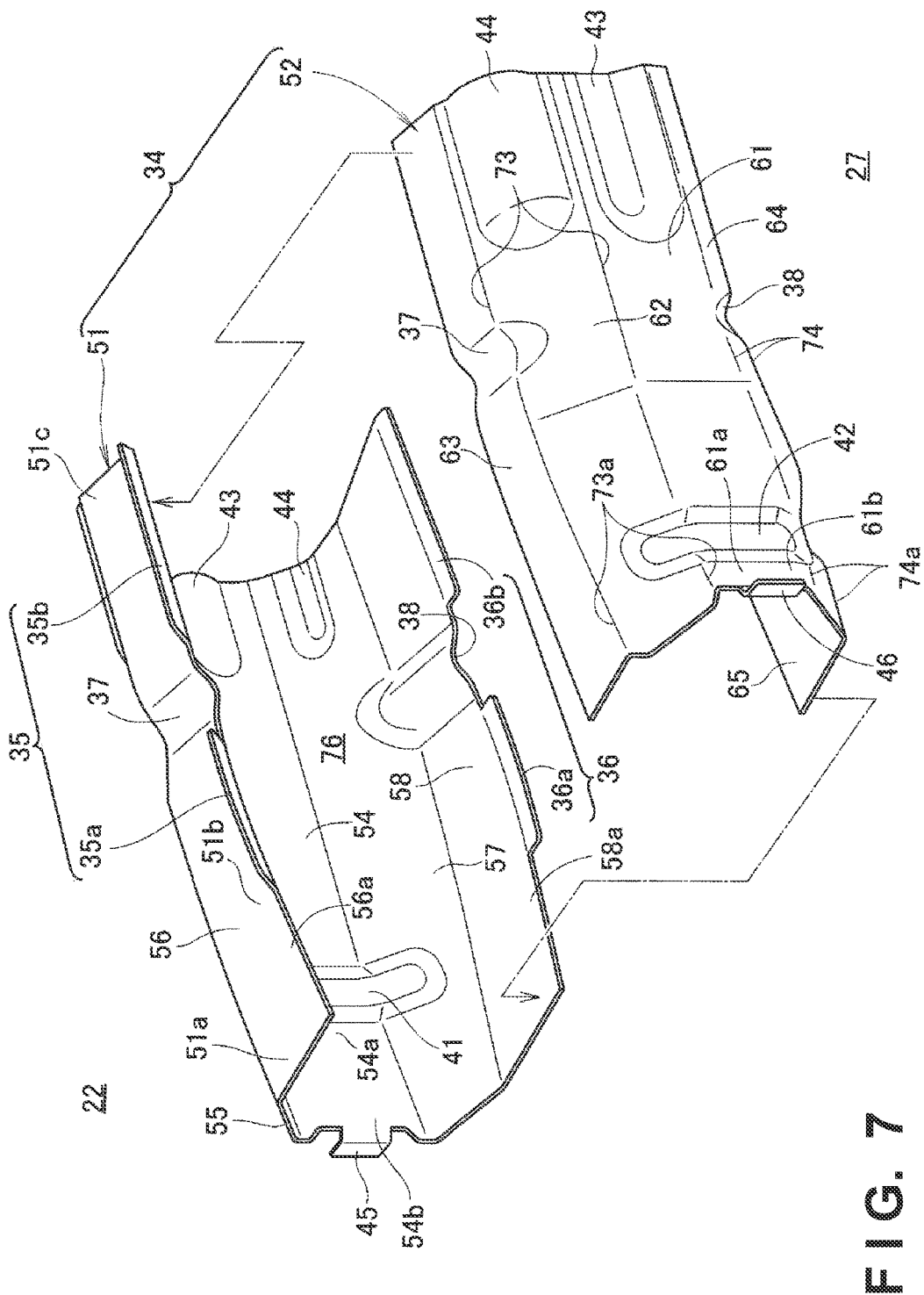
FIG. 7 is an exploded perspective view showing a frame impact absorbing part in FIG. 6.
Figure 8:
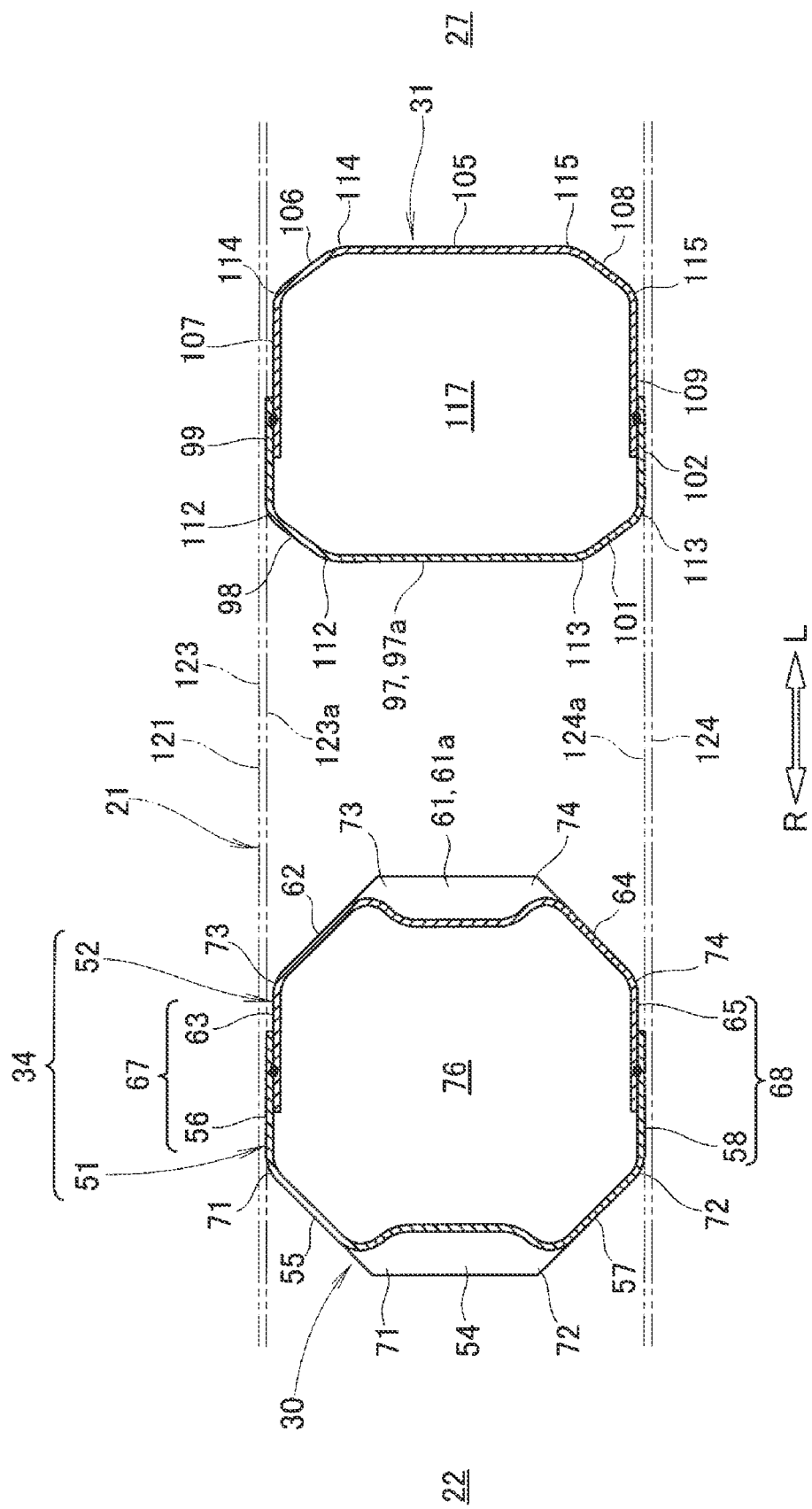
FIG. 8 is a sectional view taken along a line 8-8 in FIG. 4.

As shown in FIGS. 7 and 8, the first frame bending member 51 includes a frame inner wall 54, a first frame upper slope portion 55, a first frame upper portion 56, a first frame lower slope portion 57, and a first frame lower portion 58.

The frame inner wall 54 is arranged on the inside in the vehicle width direction so as to face the engine room 22. The first frame upper slope portion 55 is bent upslope from the upper side of the frame inner wall 54 outward in the vehicle width direction. The first frame upper portion 56 is bent almost horizontally from the upper side of the first frame upper slope portion 55 outward in the vehicle width direction.

The first frame lower slope portion 57 is bent downslope from the lower side of the frame inner wall 54 outward in the vehicle width direction. The first frame lower portion 58 is bent almost horizontally from the lower side of the first frame lower slope portion 57 outward in the vehicle width direction.

The first frame bending member 51 is formed into an almost U-shaped sectional shape by the frame inner wall 54, the first frame upper slope portion 55, the first frame upper portion 56, the first frame lower slope portion 57, and the first frame lower portion 58.

The first frame upper portion 56 is joined to a bumper upper portion 123 in a state in which the first frame upper portion 56 contacts a back surface 123a (see FIG. 3 as well) of the bumper upper portion 123 of the bumper beam 21. The first frame lower portion 58 is joined to a bumper lower portion 124 in a state in which the first frame lower portion 58 contacts a back surface 124a (see FIG. 3 as well) of the bumper lower portion 124 of the bumper beam 21.

The second frame bending member 52 includes a frame outer wall (outer wall) 61, a second frame upper slope portion 62, a second frame upper portion 63, a second frame lower slope portion 64, and a second frame lower portion 65.

The frame outer wall 61 is arranged on the outside in the vehicle width direction so as to face the member impact absorbing part 31. The frame outer wall 61 is formed to curve such that a front end (end portion) 61a comes close to the member impact absorbing part 31 toward the bumper beam 21 (see FIG. 9).

The second frame upper slope portion 62 is bent upslope from the upper side of the frame outer wall 61 inward in the vehicle width direction. The second frame upper portion 63 is bent almost horizontally from the upper side of the second frame upper slope portion 62 inward in the vehicle width direction.

The second frame lower slope portion 64 is bent downslope from the lower side of the frame outer wall 61 inward in the vehicle width direction. The second frame lower portion 65 is bent almost horizontally from the lower side of the second frame lower slope portion 64 inward in the vehicle width direction.

The second frame bending member 52 is formed into an almost U-shaped sectional shape by the frame outer wall 61, the second frame upper slope portion 62, the second frame upper portion 63, the second frame lower slope portion 64, and the second frame lower portion 65.

The second frame upper portion 63 overlaps the first frame upper portion 56 in the vertical direction. The first frame upper portion 56 and the second frame upper portion 63 are joined by spot welding. The second frame lower portion 65 overlaps the first frame lower portion 58 in the vertical direction. The first frame lower portion 58 and the second frame lower portion 65 are joined by spot welding.

Hence, the first frame bending member 51 and the second frame bending member 52 are joined. The frame tubular body 34 is thus formed, by the first frame bending member 51 and the second frame bending member 52, as a hollow member having an almost octagonal section.

The first frame upper portion 56 and the second frame upper portion 63 form a frame upper portion 67 of the frame tubular body 34. The first frame lower portion 58 and the second frame lower portion 65 form a frame lower portion 68 of the frame tubular body 34.

When the frame tubular body 34 is formed into an almost octagonal section, a pair of upper inner frame ridge portions 71 and a pair of lower inner frame ridge portions 72 are formed on the inside of the frame tubular body 34 in the vehicle width direction. In addition, a pair of upper outer frame ridge portions (upper outer ridge portions) 73 and a pair of lower outer frame ridge portions (lower outer ridge portions) 74 are formed on the outside of the frame tubular body 34 in the vehicle width direction.

Figure 9:
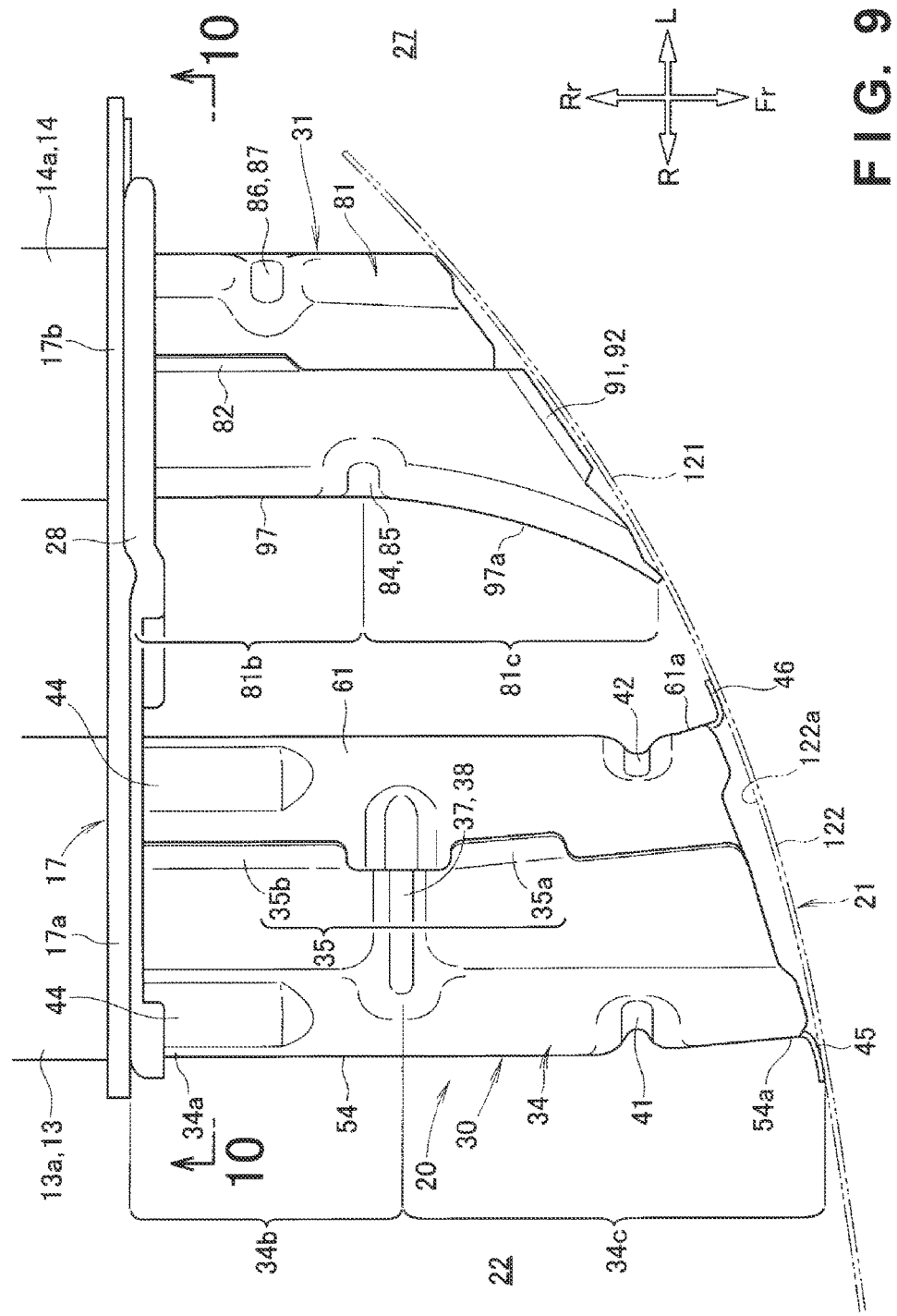
FIG. 9 is a plan view showing the left shock absorbing means in FIG. 4.

As shown in FIGS. 7 and 9, the upper outer frame ridge portions 73 and the lower outer frame ridge portions 74 are formed to curve such that front ends (end portions) 73a of the upper outer frame ridge portions 73 and front ends (end portions) 74a of the lower outer frame ridge portions 74 come close to the member impact absorbing part 31 toward the bumper beam 21, like the front end 61a of the frame outer wall 61.

The front end 61a of the frame outer wall 61 includes the outer second fragile portion (second fragile portion) (to be described later).

A rear end 34a (a part on the vehicle body frame member side) of the frame tubular body 34 is joined to the vehicle width direction inner half portion 17a of the left connecting plate 17 by welding from the front side of the vehicle body. In this state, the frame tubular body 34 projects from the vehicle width direction inner half portion 17a of the left connecting plate 17 to the front side of the vehicle body.

As shown in FIGS. 4 and 7, the upper frame flange 35 is bent to slope upward from an outer side (lateral side) 56a of the first frame upper portion 56.

The upper frame flange 35 extends toward the rear side of the vehicle body along the outer side 56a of the first frame upper portion 56 from a portion 51b on the side of a front end 51a of the first frame bending member 51 to a rear end 51c on the side of the left front side frame 13.

The lower frame flange 36 is bent to slope downward from an outer side (lateral side) 58a of the first frame lower portion 58.

Like the upper frame flange 35, the lower frame flange 36 extends toward the rear side of the vehicle body along the outer side 58a of the first frame lower portion 58 from the portion 51b on the side of the front end 51a of the first frame bending member 51 to the rear end 51c on the side of the left front side frame 13.

That is, the upper frame flange 35 and the lower frame flange 36 project outward from the frame tubular body 34. The rigidity of the frame tubular body 34 to a collision load in the longitudinal direction of the vehicle body is thus ensured by the upper frame flange 35 and the lower frame flange 36.

The upper first fragile portion 37 is formed at the center of the frame upper portion 67 of the frame tubular body 34 in the longitudinal direction of the vehicle body. The upper first fragile portion 37 is formed into a concave bead that sinks from the frame upper portion 67 toward an interior 76 of the frame tubular body 34 and extends in the vehicle width direction.

When the upper first fragile portion 37 is formed in the frame upper portion 67, the upper frame flange 35 is divided into a front upper frame flange 35a and a rear upper frame flange 35b. The rear upper frame flange 35b is formed on a rear portion 34b of the frame tubular body 34.

The lower first fragile portion 38 is formed at the center of the frame lower portion 68 of the frame tubular body 34 in the longitudinal direction of the vehicle body. That is, the lower first fragile portion 38 is formed at the same position as the upper first fragile portion 37 in the longitudinal direction of the vehicle body.

The lower first fragile portion 38 is formed into a concave bead that sinks from the frame lower portion 68 toward the interior 76 of the frame tubular body 34 and extends in the vehicle width direction. When the lower first fragile portion 38 is formed in the frame lower portion 68, the lower frame flange 36 is divided into a front lower frame flange 36a and a rear lower frame flange 36*b*. The rear lower frame flange 36*b* is formed on the rear portion 34*b* of the frame tubular body 34.

Concave beads extending in the vehicle width direction are thus formed as the upper first fragile portion 37 and the lower first fragile portion 38. The upper first fragile portion 37 and the lower first fragile portion 38 are portions serving as the staring points of deformation of the frame tubular body 34 upon a light collision.

The inner second fragile portion 41 is formed at a front end 54*a* of the frame inner wall 54 of the frame tubular body 34 on the front side of the vehicle body (that is, the collision load input side) with respect to the front upper frame flange 35*a* and the front lower frame flange 36*a*.

The inner second fragile portion 41 is formed into a concave bead that sinks from the frame inner wall 54 toward the interior 76 of the frame tubular body 34 and extends in the vertical direction.

The outer second fragile portion 42 is formed at the front end 61*a* of the frame outer wall 61 of the frame tubular body 34 on the front side of the vehicle body (that is, the collision load input side) with respect to the front upper frame flange 35*a* and the front lower frame flange 36*a*. That is, the outer second fragile portion 42 is formed at the same position as the inner second fragile portion 41 in the longitudinal direction of the vehicle body.

The front end 61*a* of the frame outer wall 61 is formed to curve such that it comes close to the member impact absorbing part 31 toward the bumper beam 21, like the front ends 73*a* of the upper outer frame ridge portions 73 and the front ends 74*a* of the lower outer frame ridge portions 74 (see FIG. 9).

The outer second fragile portion 42 is formed into a concave bead that sinks from the frame outer wall 61 toward the interior 76 of the frame tubular body 34 and extends in the vertical direction.

Figure 10:
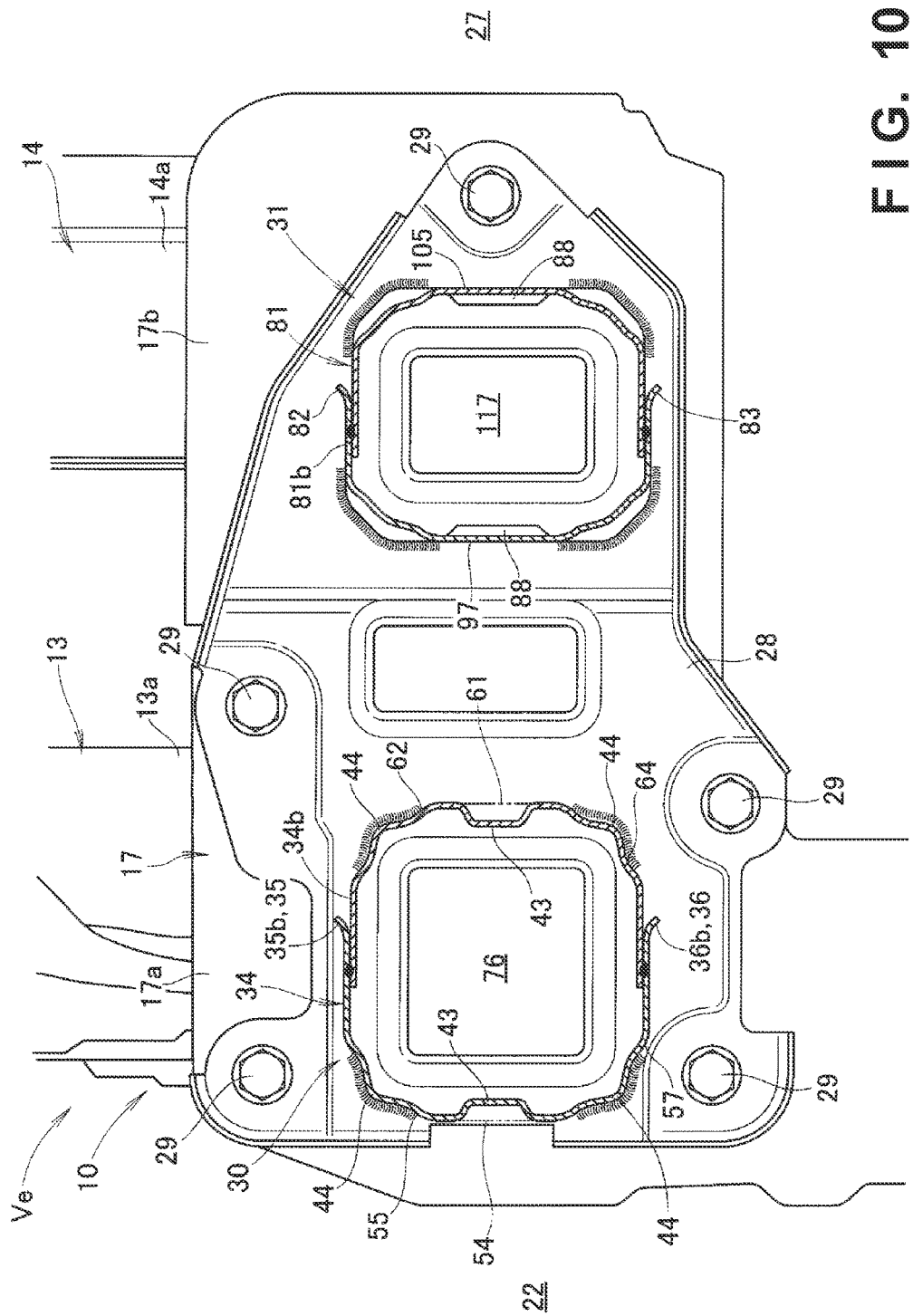
FIG. 10 is a sectional view taken along a line 10-10 in FIG. 9.

As shown in FIGS. 7 and 10, the plurality of frame rigid portions 43 and 44 are formed on the rear portion 34*b* (see FIG. 4) on the side of the left front side frame 13 with respect to the upper first fragile portion 37 and the lower first fragile portion 38 out of the frame tubular body 34.

More specifically, the concave frame rigid portions 43 are formed in the frame inner wall 54 and the frame outer wall 61 out of the rear portion 34*b* of the frame tubular body 34. In addition, the convex frame rigid portions 44 are formed on the first frame upper slope portion 55, the first frame lower slope portion 57, the second frame upper slope portion 62, and the second frame lower slope portion 64.

The concave frame rigid portions 43 are formed into concave beads that sink from the frame inner wall 54 and the frame outer wall 61 toward the interior 76 of the frame tubular body 34 and extend in the longitudinal direction of the vehicle body.

The convex frame rigid portions 44 are formed into convex beads that project from the first frame upper slope portion 55, the first frame lower slope portion 57, the second frame upper slope portion 62, and the second frame lower slope portion 64 toward the exterior of the frame tubular body 34 and extend in the longitudinal direction of the vehicle body.

The plurality of frame rigid portions 43 and 44 are thus formed on the rear portion 34*b* of the frame tubular body 34. The rear upper frame flange 35*b* and the rear lower frame flange 36*b* are also formed on the rear portion 34*b* of the frame tubular body 34.

That is, the rigidity of the rear portion 34*b* of the frame tubular body 34 to a collision load input from the front side of the vehicle body is thus ensured by the plurality of frame rigid portions 43 and 44, the rear upper frame flange 35*b*, and the rear lower frame flange 36*b*.

Hence, the rigidity of the rear portion 34*b* of the frame tubular body 34 is ensured without using a reinforcing member as a separate member.

Accordingly, as shown in FIG. 9, in a frontal collision or offset collision of a high collision speed more than a light collision, the rear portion (that is, the load deformation region) 34*b* of the frame tubular body 34 can suitably be deformed to ensure the initial energy absorption amount.

In addition, when the rigidity of the rear portion 34*b* of the frame tubular body 34 is ensured without using a reinforcing member as a separate member, the frame impact absorbing part 30 can be made lightweight. Furthermore, when a reinforcing member is unnecessary, the structure is simplified, and the manufacture can be facilitated.

The portion of the frame tubular body 34 on the front side of the vehicle body with respect to the upper first fragile portion 37 and the lower first fragile portion 38 is a light collision load deformation region 34*c*. When the light collision load deformation region 34*c* is provided on the frame tubular body 34, a light collision load input by a light collision can deform the light collision load deformation region 34*c*, and the light collision load can be absorbed.

The inner joint piece 45 is bent from a front edge 54*b* of the frame inner wall 54 inward in the vehicle width direction (that is, to the side of the engine room 22). In addition, the outer joint piece 46 is bent from a front edge 61*b* of the frame outer wall 61 outward in the vehicle width direction (that is, to the side of an exterior 27 of the vehicle Ve).

The inner joint piece 45 and the outer joint piece 46 are joined to a back surface 122*a* of a bumper front wall 122 of the bumper beam 21.

As shown in FIG. 4, the member impact absorbing part 31 is provided on the outside of the frame impact absorbing part 30 in the vehicle width direction. The member impact absorbing part 31 is connected to the vehicle width direction outer half portion 17*b* of the left connecting plate 17 from the front side of the vehicle body.

The member impact absorbing part 31 is a bumper beam extension that projects from the side of the front end 14*a* of the left upper member 14 up to the bumper beam 21 (see FIG. 2) on the front side of the vehicle body.

As shown in FIG. 6, the member impact absorbing part 31 includes a hollow member tubular body 81, an upper member flange (member flange) 82, a lower member flange (member flange) 83, an upper third fragile portion (third fragile portion) 84, a lower third fragile portion (third fragile portion) 85, an upper fourth fragile portion (fourth fragile portion) 86, a lower fourth fragile portion (frame rigid portions) 87, a plurality of member rigid portions 88, an upper joint piece 91, and a lower joint piece 92.

Figure 11:
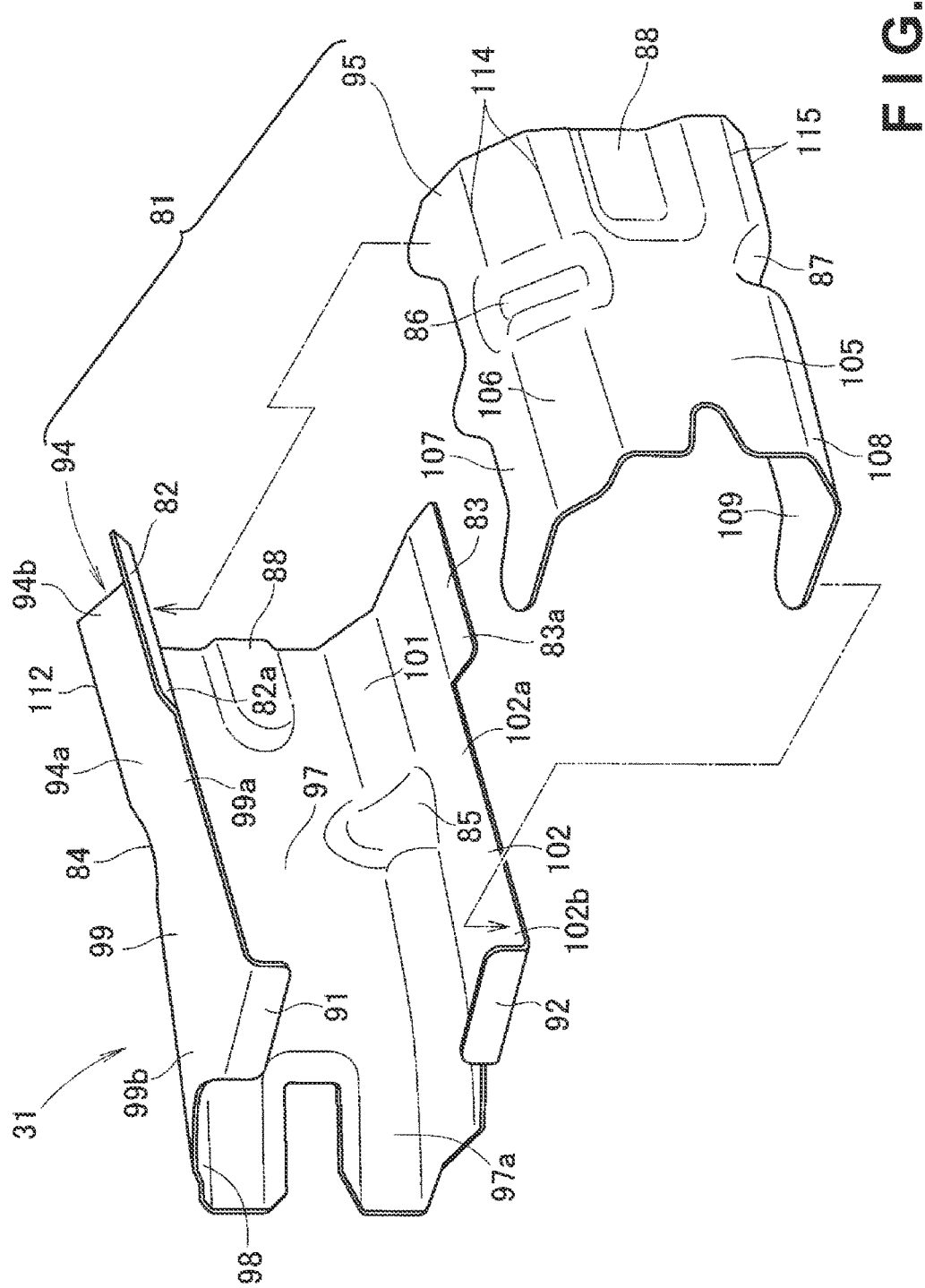
FIG. 11 is an exploded perspective view showing a member impact absorbing part in FIG. 6.

As shown in FIGS. 8 and 11, the member tubular body 81 includes a first member bending member 94 bent into an almost U-shaped sectional shape, and a second member bending member 95 bent into an almost U-shaped sectional shape.

The first member bending member 94 includes a member inner wall (inner wall) 97, a first member upper slope portion 98, a first member upper portion 99, a first member lower slope portion 101, and a first member lower portion 102.

The member inner wall 97 is arranged on the inside in the vehicle width direction so as to face the frame impact absorbing part 30. The member inner wall 97 is formed to curve such that a front end (end portion) 97*a* comes close to the frame impact absorbing part 30 toward a bumper slope portion 121 (see FIG. 9) of the bumper beam 21.

The first member upper slope portion 98 is bent upslope from the upper side of the member inner wall 97 outward in the vehicle width direction. The first member upper portion 99 is bent almost horizontally from the upper side of the first member upper slope portion 98 outward in the vehicle width direction.

The first member lower slope portion 101 is bent downslope from the lower side of the member inner wall 97 outward in the vehicle width direction. The first member lower portion 102 is bent almost horizontally from the lower side of the first member lower slope portion 101 outward in the vehicle width direction.

The first member bending member 94 is formed into an almost U-shaped sectional shape by the member inner wall 97, the first member upper slope portion 98, the first member upper portion 99, the first member lower slope portion 101, and the first member lower portion 102.

The second member bending member 95 includes a member outer wall 105, a second member upper slope portion 106, a second member upper portion 107, a second member lower slope portion 108, and a second member lower portion 109.

The member outer wall 105 is arranged on the outside in the vehicle width direction so as to face the exterior 27 of the vehicle Ve. The second member upper slope portion 106 is bent upslope from the upper side of the member outer wall 105 inward in the vehicle width direction. The second member upper portion 107 is bent almost horizontally from the upper side of the second member upper slope portion 106 inward in the vehicle width direction.

The second member lower slope portion 108 is bent downslope from the lower side of the member outer wall 105 inward in the vehicle width direction. The second member lower portion 109 is bent almost horizontally from the lower side of the second member lower slope portion 108 inward in the vehicle width direction.

The second member bending member 95 is formed into an almost U-shaped sectional shape by the member outer wall 105, the second member upper slope portion 106, the second member upper portion 107, the second member lower slope portion 108, and the second member lower portion 109.

The second member upper portion 107 overlaps the first member upper portion 99. The first member upper portion 99 and the second member upper portion 107 are joined by spot welding. The second member lower portion 109 overlaps the first member lower portion 102. The first member lower portion 102 and the second member lower portion 109 are joined by spot welding.

Hence, the first member bending member 94 and the second member bending member 95 are joined. The member tubular body 81 is thus formed, by the first member bending member 94 and the second member bending member 95, as a hollow member having an almost octagonal section.

When the member tubular body 81 is formed into an almost octagonal section, a pair of upper inner member ridge portions 112 and a pair of lower inner member ridge portions 113 are formed on the inside of the member tubular body 81 in the vehicle width direction. In addition, a pair of upper outer member ridge portions 114 and a pair of lower outer member ridge portions 115 are formed on the outside of the member tubular body 81 in the vehicle width direction.

A rear end 81a (see FIG. 4) of the member tubular body 81 is joined to the vehicle width direction outer half portion 17b of the left connecting plate 17 by welding from the front side of the vehicle body. In this state, the member tubular body 81 projects from the vehicle width direction outer half portion 17b of the left connecting plate 17 to the front side of the vehicle body.

The front end 97a of the member inner wall 97 is formed to curve such that it comes close to the frame impact absorbing part 30 toward the bumper slope portion 121 (see FIG. 9) of the bumper beam 21.

The upper member flange 82 is bent to slope upward from an outer side 99a of the first member upper portion 99. The upper member flange 82 extends toward the rear side of the vehicle body along the outer side 99a of the first member upper portion 99 from a portion 94a at the center of the first member bending member 94 in the longitudinal direction of the vehicle body to a rear end 94b on the side of the left upper member 14.

The upper member flange 82 is formed on a rear portion 81b of the member tubular body 81.

The lower member flange 83 is bent to slope downward from an outer side 102a of the first member lower portion 102. The lower member flange 83 extends toward the rear side of the vehicle body along the outer side 102a of the first member lower portion 102 from the portion 94a at the center of the first member bending member 94 in the longitudinal direction of the vehicle body to the rear end 94b on the side of the left upper member 14.

The lower member flange 83 is formed on the rear portion 81b of the member tubular body 81.

That is, the upper member flange 82 and the lower member flange 83 project outward from the member tubular body 81. The rigidity of the member tubular body 81 to a collision load in the longitudinal direction of the vehicle body is thus ensured by the upper member flange 82 and the lower member flange 83.

The upper third fragile portion 84 is formed at the center of the first member upper slope portion 98 of the member tubular body 81 in the longitudinal direction of the vehicle body. The upper third fragile portion 84 is arranged almost at the same position as the upper first fragile portion 37 (See FIG. 4) in the longitudinal direction of the vehicle body. More specifically, the upper third fragile portion 84 is formed into a concave bead that sinks from the first member upper slope portion 98 toward an interior 117 of the member tubular body 81 and extends to slope in the vehicle width direction along the first member upper slope portion 98.

The lower third fragile portion 85 is formed at the center of the first member lower slope portion 101 of the member tubular body 81 in the longitudinal direction of the vehicle body. The lower third fragile portion 85 is arranged almost at the same position as the lower first fragile portion 38 in the longitudinal direction of the vehicle body. More specifically, the lower third fragile portion is formed into a concave bead that sinks from the first member lower slope portion 101 toward the interior 117 of the member tubular body 81 and extends to slope in the vehicle width direction along the first member lower slope portion 101.

The upper third fragile portion 84 and the lower third fragile portion 85 are formed on the inside of the member tubular body 81 in the vehicle width direction on the front side of the vehicle body with respect to the upper member flange 82 and the lower member flange 83.

Concave beads extending in the vehicle width direction are thus formed as the upper third fragile portion 84 and the lower third fragile portion 85 on the inside of the member tubular body 81 in the vehicle width direction. The upper third fragile portion 84 and the lower third fragile portion 85 are portions serving as the staring points (triggers) of deformation of the member tubular body 81 upon a light collision, like the upper first fragile portion 37 and the lower first fragile portion 38 of the frame tubular body 34 (see FIG. 7).

The upper fourth fragile portion 86 is formed in the second member upper slope portion 106 of the member tubular body 81 on the rear side of the vehicle body with respect to a front end 82a of the upper member flange 82. The upper fourth fragile portion 86 is formed into a concave bead that sinks from the second member upper slope portion 106 toward the interior 117 of the member tubular body 81 and extends to slope in the vehicle width direction along the second member upper slope portion 106.

The lower fourth fragile portion 87 is formed in the second member lower slope portion 108 of the member tubular body 81 on the rear side of the vehicle body with respect to a front end 83a of the lower member flange 83. The lower fourth fragile portion 87 is formed into a concave bead that sinks from the second member lower slope portion 108 toward the interior 117 of the member tubular body 81 and extends to slope in the vehicle width direction along the second member lower slope portion 108.

The upper fourth fragile portion 86 and the lower fourth fragile portion 87 are formed on the outside of the member tubular body 81 in the vehicle width direction on the rear side of the vehicle body with respect to the front end 82a of the upper member flange 82 and the front end 83a of the lower member flange 83.

As shown in FIGS. 10 and 11, the plurality of member rigid portions 88 are formed on the rear portion 81b (see FIG. 4 as well) on the side of the left upper member 14 with respect to the upper third fragile portion 84, the lower third fragile portion 85, the upper fourth fragile portion 86, and the lower fourth fragile portion 87 out of the member tubular body 81.

More specifically, the concave member rigid portions 88 are formed in the member inner wall 97 and the member outer wall 105 out of the rear portion 81b of the member tubular body 81.

The concave member rigid portions 88 are formed into concave beads that sink from the member inner wall 97 and the member outer wall 105 toward the interior 117 of the member tubular body 81 and extend in the longitudinal direction of the vehicle body. The rigidity of the rear portion 81b of the member tubular body 81 to a collision load input from the front side of the vehicle body is thus ensured by the plurality of member rigid portions 88.

The plurality of member rigid portions 88 are thus formed on the rear portion 81b of the member tubular body 81. In addition, the upper member flange 82 and the lower member flange 83 are formed on the rear portion 81b of the member tubular body 81.

That is, the rigidity of the rear portion 81b of the member tubular body 81 to a collision load input from the front side of the vehicle body is ensured by the plurality of member rigid portions 88, the upper member flange 82, and the lower member flange 83.

Hence, the rigidity of the rear portion 81b of the member tubular body 81 is ensured without using a reinforcing member as a separate member.

Accordingly, as shown in FIG. 9, in a frontal collision or offset collision of a high collision speed more than a light collision, the rear portion (that is, the load deformation region) 81b of the member tubular body 81 can suitably be deformed to ensure the initial energy absorption amount.

In addition, when the rigidity of the rear portion 81b of the member tubular body 81 is ensured without using a reinforcing member as a separate member, the member impact absorbing part 31 can be made lightweight. Furthermore, when a reinforcing member is unnecessary, the structure is simplified, and the manufacture can be facilitated.

The portion of the member tubular body 81 on the front side of the vehicle body with respect to the upper third fragile portion 84 and the lower third fragile portion 85 is a light collision load deformation region 81c. When the light collision load deformation region 81c is provided on the member tubular body 81, a light collision load input by a light collision can deform the light collision load deformation region 81c, and the light collision load can be absorbed.

The upper joint piece 91 (see FIG. 11 as well) is bent downward from a front edge 99b of the first member upper portion 99. The lower joint piece 92 (see FIG. 11 as well) is bent upward from a front edge 102b of the second member lower portion 109. The upper joint piece 91 and the lower joint piece 92 are joined to the back surface 122a of the bumper front wall 122 of the bumper beam 21.

Referring back to FIGS. 2 and 3, the bumper slope portion (a slope portion or a camber portion) 121 of the bumper beam 21 is arranged at a front end 30a of the frame impact absorbing part 30 and a front end (end portion) 31a of the member impact absorbing part 31.

The bumper beam 21 includes the bumper front wall 122 formed on the front side of the vehicle body, a bumper upper portion 123 projecting from the upper side of the bumper front wall 122 to the rear side of the vehicle body, and a bumper lower portion 124 projecting from the lower side of the bumper front wall 122 to the rear side of the vehicle body.

The bumper beam 21 is formed into an almost U-shaped sectional shape by the bumper front wall 122, the bumper upper portion 123, and the bumper lower portion 124. The front end 30a of the frame impact absorbing part 30 and the front end 31a of the member impact absorbing part 31 are arranged in an interior 126 of the bumper slope portion 121.

An upper welding hole 131 is formed in the upper portion of the bumper front wall 122 of the bumper slope portion 121, and a lower welding hole 132 is formed in the lower portion. A welding hole 134 is formed in a rear side 123b of the bumper upper portion 123. A welding hole 135 is formed in a rear side 124b of the bumper lower portion 124.

The front end 30a of the frame impact absorbing part 30 and the front end 31a of the member impact absorbing part 31 abut against the bumper front wall 122. In this state, the inner joint piece 45 and the outer joint piece 46 of the frame impact absorbing part 30 are joined from the rear side of the vehicle body to the back surface 122a of the bumper front wall 122 of the bumper slope portion 121 by MIG welding.

A front end 56b of the first frame upper portion 56 is joined from above to the periphery (more specifically, the rear side of the periphery) of the welding hole 134 of the bumper upper portion 123 by MIG welding. That is, the front end 56b of the first frame upper portion 56 is joined to the rear side 123b of the bumper upper portion 123 of the bumper slope portion 121.

In addition, a front end 58b of the first frame lower portion 58 is joined from below to the periphery (more specifically, the rear side of the periphery) of the welding hole 135 of the bumper lower portion 124 by MIG welding. That is, the front end 58b of the first frame lower portion 58 is joined to the rear side 124b of the bumper lower portion 124 of the bumper slope portion 121.

The front end 30a of the frame impact absorbing part 30 is thus joined to the bumper slope portion 121 in a state in which the front end 30a abuts against the bumper front wall 122 of the bumper slope portion 121.

The upper joint piece 91 of the member impact absorbing part 31 is joined from the front side of the vehicle body to the periphery (more specifically, the upper side of the periphery) of the upper welding hole 131 of the bumper front wall 122 by MIG welding. In addition, the lower joint piece 92 of the member impact absorbing part 31 is joined from the front side of the vehicle body to the periphery (more specifically, the lower side of the periphery) of the lower welding hole 132 of the bumper front wall 122 by MIG welding.

The front end 31a of the member impact absorbing part 31 is thus joined to the bumper slope portion 121 in a state in which the front end 31a abuts against the bumper front wall 122 of the bumper slope portion 121.

The front end 30a of the frame impact absorbing part 30 and the front end 31a of the member impact absorbing part 31 are thus welded to the bumper front wall 122 of the bumper slope portion 121, the rear side 123b of the bumper upper portion 123, and the rear side 124b of the bumper lower portion 124.

It is therefore possible to bring the bumper slope portion 121 into direct contact with the front end 30a of the frame impact absorbing part 30 and the front end 31a of the member impact absorbing part 31. Accordingly, the bumper slope portion 121 can come close to the frame impact absorbing part 30 and the member impact absorbing part 31, and the total body length of the vehicle Ve can be shortened.

An example in which a light collision load input by a light collision is absorbed by the left shock absorbing means 20 according to the present invention will be described next with reference to FIG. 12.

Figure 12:
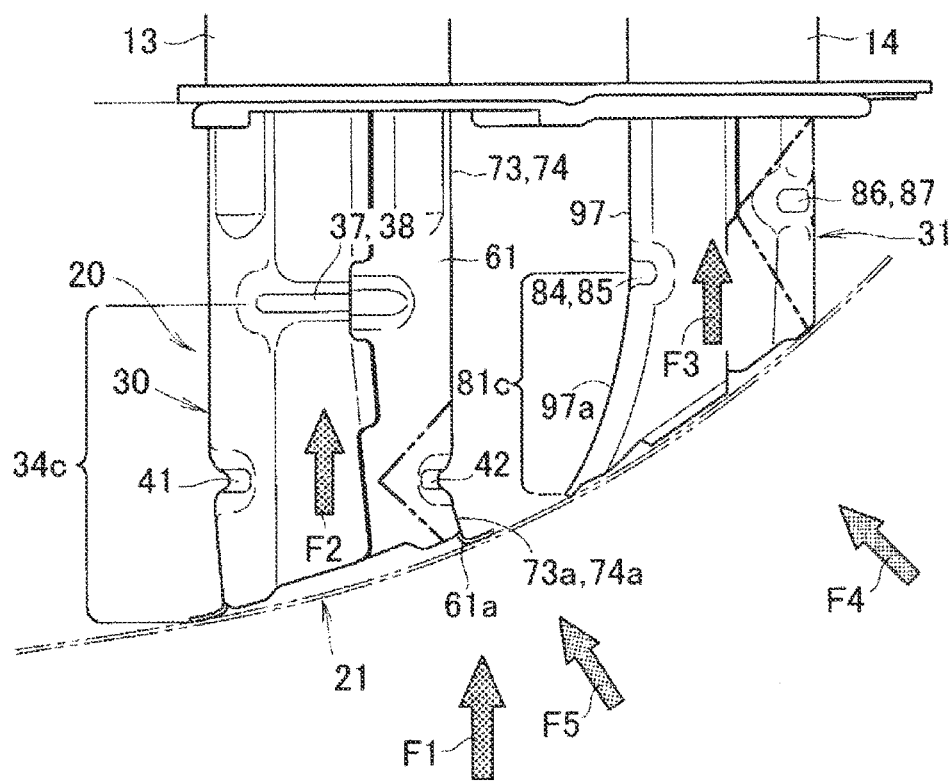
FIG. 12 is a view for explaining an example in which a collision load by a light collision is absorbed by the left shock absorbing means according to the present invention.

As shown in FIG. 12, a light collision load F1 is input to the bumper beam 21 by a light collision. The input light collision load F1 is transmitted to the frame impact absorbing part 30 and the member impact absorbing part 31 via the bumper beam 21.

That is, a light collision load F2 is transmitted to the frame impact absorbing part 30. Hence, a stress concentrates to the upper first fragile portion 37 and the lower first fragile portion 38, and the upper first fragile portion 37 and the lower first fragile portion 38 bend.

It is therefore possible to efficiently deform the light collision load deformation region 34c and suitably absorb the light collision load (that is, light energy) F2 without deforming the left front side frame 13 by the light collision load F2 input by the light collision. The light collision load deformation region 34c is the portion on the front side of the vehicle body with respect to the upper first fragile portion 37 and the lower first fragile portion 38.

At the same time, a light collision load F3 is transmitted to the member impact absorbing part 31. Hence, a stress concentrates to the upper third fragile portion 84 and the lower third fragile portion 85, and the upper third fragile portion 84 and the lower third fragile portion 85 bend.

It is therefore possible to efficiently deform the light collision load deformation region 81c and suitably absorb the light collision load (that is, light energy) F3 without deforming the left upper member 14 by the light collision load F3 input by the light collision. The light collision load deformation region 81c is the portion on the front side of the vehicle body with respect to the upper third fragile portion 84 and the lower third fragile portion 85.

Since the light collision load F1 input by the light collision can suitably be absorbed by the frame impact absorbing part 30 and the member impact absorbing part 31, the absorption amount of the light collision load F1 can be increased.

The inner second fragile portion 41 and the outer second fragile portion 42 are formed in the frame impact absorbing part 30. Hence, when the light collision load F2 is transmitted to the frame impact absorbing part 30, the light collision load deformation region 34c of the frame impact absorbing part 30 can reliably be deformed, by the transmitted light collision load F2, from the inner second fragile portion 41 and the outer second fragile portion 42.

This can increase the absorption amount of the light collision load F2 input to the frame impact absorbing part 30.

In the member impact absorbing part 31, the front end 97a of the member inner wall 97 is formed to curve such that it comes close to the frame impact absorbing part 30 toward the bumper slope portion 121 of the bumper beam 21.

Hence, the front end 97a formed to curve can suitably be crushed by the light collision load F3 transmitted to the member impact absorbing part 31. This can increase the absorption amount of the light collision load F3 input to the member impact absorbing part 31.

If the light collision is an oblique collision, a light collision load F4 is considered to be input obliquely from the front side to the member impact absorbing part 31. To cope with this, the upper fourth fragile portion 86 and the lower fourth fragile portion 87 are provided in the member impact absorbing part 31 on the outside in the vehicle width direction.

Hence, the member impact absorbing part 31 can efficiently be bent and deformed, by the light collision load F4 input obliquely from the front side, from the upper fourth fragile portion 86 and the lower fourth fragile portion 87 serving as the starting points, as indicated by an imaginary line. This allows the member impact absorbing part 31 to suitably absorb the light collision load (that is, light energy) F4 input obliquely from the front side to the member impact absorbing part 31.

If the light collision is an oblique collision, a light collision load F5 is considered to be input obliquely from the front side to the frame impact absorbing part 30.

To cope with this, the front end 73a of the upper outer frame ridge portions 73 of the frame impact absorbing part 30 and the front end 74a of the lower outer frame ridge portions 74 are formed to curve such that they come close to the member impact absorbing part 31 toward the bumper slope portion 121 of the bumper beam 21. In addition, the outer second fragile portion 42 is formed in the front end 61a of the frame outer wall 61.

It is therefore possible to suitably increase the rigidity (that is, the load bearing ability) to the light collision load F5 input obliquely from the front side by the front end 73a of the upper outer frame ridge portion 73 and the front end 74a of the lower outer frame ridge portion 74.

That is, the frame impact absorbing part 30 can efficiently be bent and deformed, by the light collision load F5 input obliquely from the front side, from the outer second fragile portion 42 serving as the starting point, as indicated by an imaginary line. This allows the frame impact absorbing part 30 to suitably absorb the light collision load (that is, light energy) F5.

An example in which a collision load input by a frontal collision or offset collision of a high collision speed more than a light collision is absorbed by the left shock absorbing means 20 according to the present invention will be described next with reference to FIG. 13.

Figure 13:
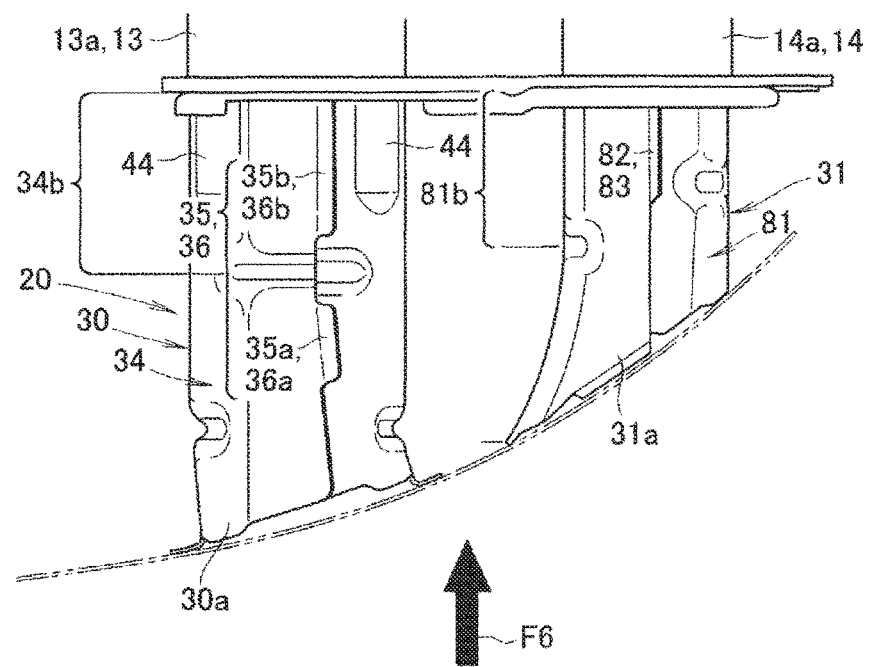
FIG. 13 is a view for explaining an example in which a collision load by a frontal collision or offset collision is absorbed by the left shock absorbing means according to the present invention.

As shown in FIG. 13, the rigidity of the rear portion 34b of the frame impact absorbing part 30 (more specifically, the frame tubular body 34) to a collision load F6 input from the front side of the vehicle body is ensured by the plurality of frame rigid portions 43 and 44 (for the frame rigid portions 43, see FIG. 7), the rear upper frame flange 35b, and the rear lower frame flange 36b.

Hence, the rear portion (that is, the load deformation region) 34b of the frame tubular body 34 with the ensured rigidity can be crushed by the collision load F6 input by a frontal collision or offset collision, and the initial energy of the collision load F6 can suitably be absorbed.

In addition to the frame impact absorbing part 30, the member impact absorbing part 31 is provided on the side of the front end 14a of the left upper member 14. Hence, the rigidity to the collision load F6 input by a frontal collision or offset collision can be raised.

This can increase the absorption amount of the initial energy of the collision load F6 by the frame impact absorbing part 30 or the member impact absorbing part 31.

Additionally, the rigidity of the rear portion 81b of the member impact absorbing part 31 (more specifically, the member tubular body 81) to a collision load input from the front side of the vehicle body is suitably ensured by the plurality of member rigid portions 88, the upper member flange 82, and the lower member flange 83.

Hence, the rear portion (that is, the load deformation region) 81b of the member tubular body 81 can be crushed by the collision load F6 input by a frontal collision or offset collision.

Accordingly, the rear portion 81b of the member tubular body 81 can be crushed together with the rear end 34a of the frame tubular body 34 by the collision load F6 input by a frontal collision or offset collision, and the absorption amount of the initial energy of the collision load F6 can be increased.

After the rear end 34a of the frame tubular body 34 or the rear portion 81b of the member tubular body 81 is crushed to absorb the initial energy, the left front side frame 13 or the left upper member 14 can be deformed to absorb the rest of energy.

That is, as shown in FIGS. 12 and 13, according to the frame impact absorbing part 30 and the member impact absorbing part 31, it is possible to absorb light energy upon a light collision and also absorb the initial energy of a frontal collision or offset collision.

The bumper slope portion 121 of the bumper beam 21 is in direct contact with the front end 30a of the frame impact absorbing part 30 and the front end 31a of the member impact absorbing part 31. It is therefore possible to quickly transmit the light collision load F1, F4, or F5 by a light collision or the collision load F6 by a frontal collision or offset collision to the front end 30a of the frame impact absorbing part 30 and the front end 31a of the member impact absorbing part 31.

This allows the frame impact absorbing part 30 and the member impact absorbing part 31 to early absorb the light collision load F1, F4, or F5 or the collision load F6.

Note that the vehicle body structure with the impact absorbing part according to the present invention is not limited to the above-described embodiment, and changes and modifications can appropriately be made.

For example, in the embodiment, the vehicle body front structure has been exemplified as the vehicle body structure 10. However, the present invention is not limited to this and is applicable to, for example, a vehicle body rear structure as the vehicle body structure 10.

In the embodiment, the left front side frame 13 or the right front side frame 13 has been exemplified as a vehicle body frame member. However, the present invention is not limited to this and is applicable to, for example, a left rear frame or a right rear frame as a vehicle body frame member.

In the embodiment, an example in which the upper frame flange 35 and the lower frame flange 36 project from the first frame bending member 51 of the frame impact absorbing part 30 has been described. However, the present invention is not limited to this, and the upper frame flange 35 and the lower frame flange 36 may project from the second frame bending member 52.

In the embodiment, an example in which the upper member flange 82 and the lower member flange 83 project from the first member bending member 94 of the member impact absorbing part 31 has been described. However, the present invention is not limited to this, and the upper member flange 82 and the lower member flange 83 may project from the second member bending member 95.

In the embodiment, the upper first fragile portion 37, the lower first fragile portion 38, the inner second fragile portion 41, and the outer second fragile portion 42 of the frame impact absorbing part 30 are formed by concave beads. However, the present invention is not limited to this, and the fragile portions may be formed by convex beads or openings.

In the embodiment, the upper third fragile portion 84, the lower third fragile portion 85, the upper fourth fragile portion 86, and the lower fourth fragile portion 87 of the member impact absorbing part 31 are formed by concave beads. However, the present invention is not limited to this, and the fragile portions may be formed by convex beads or openings.

The shapes and constitutions of the vehicle body structure with the impact absorbing part, the left and right front side frames, the left and right upper members, the bumper beam, the frame impact absorbing part, the member impact absorbing part, the frame tubular body, the upper and lower frame flanges, the upper and lower first fragile portions, the inner and outer second fragile portions, the frame rigid portions, the first frame bending member, the second frame bending member, the member tubular body, the upper and lower member flanges, the upper and lower third fragile portions, the upper and lower fourth fragile portions, and the member rigid portions are not limited to those exemplified above and can appropriately be changed.

The vehicle body structure with the impact absorbing part according to the present invention can suitably be applied to an automobile including an impact absorbing part extending in the longitudinal direction of the vehicle body from an end side of a vehicle body frame member.

What is claimed is:

1. A vehicle body structure with an impact absorbing part, which includes an impact absorbing part extending in a longitudinal direction of a vehicle body from an end side of a vehicle body frame member,
    wherein the impact absorbing part comprises:
    a first bending member bent into a substantially U-shaped sectional shape;
    a second bending member bent into a substantially U-shaped sectional shape and connected to the first bending member so as to form a hollow tubular body;
    a flange projecting outward from the tubular body and extending in the longitudinal direction of the vehicle body up to a side of the vehicle body frame member on a lateral side of one of the first bending member and the second bending member;

a first fragile portion configured to divide the flange in the longitudinal direction of the vehicle body and serve as a starting point of deformation upon a light collision; and a rigid portion formed on the side of the vehicle body frame member with respect to the first fragile portion.

2. The structure according to claim 1, wherein the impact absorbing part comprises a second fragile portion on a collision load input side with respect to the flange.

3. The structure according to claim 1, wherein the vehicle body frame member comprises a front side frame arranged on an outside in a vehicle width direction and extending in the longitudinal direction of the vehicle body, the impact absorbing part comprises a frame impact absorbing part provided on a side of a front end of the front side frame, an upper member is provided on an outside of the front side frame in the vehicle width direction, a member impact absorbing part is provided on an outside of the impact absorbing part in the vehicle width direction on a side of a front end of the upper member, and the member impact absorbing part comprises:
a hollow member tubular body extending in the longitudinal direction of the vehicle body; and
a third fragile portion formed in the member tubular body and arranged substantially at the same position as the first fragile portion in the longitudinal direction of the vehicle body.

4. The structure according to claim 3, wherein the member impact absorbing part comprises:
a member flange projecting outward from the member tubular body and extending up to a side of the upper member in the longitudinal direction of the vehicle body on the side of the upper member with respect to the third fragile portion; and
a member rigid portion formed on the side of the upper member with respect to the third fragile portion.

5. The structure according to claim 3, further comprising a bumper beam with a slope portion arranged at end portions of the frame impact absorbing part and the member impact absorbing part, wherein the member impact absorbing part comprises an inner wall on an inside in the vehicle width direction, and the inner wall is formed to curve such that an end portion of the inner wall comes close to the frame impact absorbing part toward the bumper beam.

6. The structure according to claim 4, wherein the member impact absorbing part comprises a fourth fragile portion on an outside of the member tubular body in the vehicle width direction.

7. The structure according to claim 3, wherein the frame impact absorbing part comprises a second fragile portion on a collision load input side with respect to the flange, and in the frame impact absorbing part,
the tubular body is formed into a substantially octagonal section so as to form an upper outer ridge portion and a lower outer ridge portion on an outer side of the tubular body in the vehicle width direction, an end portion of each of the upper outer ridge portion and the lower outer ridge portion is formed to curve such that the end portion comes close to the member impact absorbing part toward the bumper beam, and the second fragile portion is provided in an outer wall on the outside of the tubular body in the vehicle width direction at the end portion of each of the upper outer ridge portion and the lower outer ridge portion.

8. The structure according to claim 5, wherein the bumper beam comprises:
a bumper front wall formed on a front side of the vehicle body;
a bumper upper portion projecting from an upper side of the front wall 122 to a rear side of the vehicle body; and
a bumper lower portion projecting from a lower side of the front wall to the rear side of the vehicle body, the bumper beam is formed into a substantially U-shaped sectional shape by the bumper front wall, the bumper upper portion, and the bumper lower portion, and the end portions of the frame impact absorbing part and the member impact absorbing part abut against the bumper front wall and are welded to the bumper front wall, a rear side of the bumper upper portion, and a rear side of the bumper lower portion.

\* \* \* \* \*